(12) United States Patent
Tadano et al.

(10) Patent No.: US 10,558,176 B2
(45) Date of Patent: Feb. 11, 2020

(54) FEEDBACK CONTROL SYSTEM WITH PERIODIC DISTURBANCE SUPPRESSION AND RESONANCE/DISTURBANCE SUPPRESSION USING μ-SYNTHESIS

(71) Applicant: Meidensha Corporation, Tokyo (JP)

(72) Inventors: Yugo Tadano, Tokyo (JP); Masakatsu Nomura, Tokyo (JP)

(73) Assignee: Meidensha Corporation, Tokyo (JP)

( * ) Notice: Subject to any disclaimer, the term of this patent is extended or adjusted under 35 U.S.C. 154(b) by 0 days.

(21) Appl. No.: 16/313,558

(22) PCT Filed: Mar. 15, 2017

(86) PCT No.: PCT/JP2017/010427
§ 371 (c)(1),
(2) Date: Dec. 27, 2018

(87) PCT Pub. No.: WO2018/003200
PCT Pub. Date: Jan. 4, 2018

(65) Prior Publication Data
US 2019/0227500 A1 Jul. 25, 2019

(30) Foreign Application Priority Data

Jun. 27, 2016 (JP) .................................. 2016-126129

(51) Int. Cl.
*G05B 13/02* (2006.01)
(52) U.S. Cl.
CPC .................... *G05B 13/02* (2013.01)
(58) Field of Classification Search
None
See application file for complete search history.

(56) References Cited

U.S. PATENT DOCUMENTS

| 2003/0083793 A1* | 5/2003 | Akiyama | ............ G01M 15/044 |
| | | | 701/114 |
| 2003/0088345 A1* | 5/2003 | Akiyama | ............ G01M 15/044 |
| | | | 701/32.8 |

(Continued)

FOREIGN PATENT DOCUMENTS

| JP | 2003121308 A | 4/2003 |
| JP | 2003149085 A | 5/2003 |

(Continued)

*Primary Examiner* — Bernard G Lindsay
(74) *Attorney, Agent, or Firm* — Servilla Whitney LLC

(57) ABSTRACT

A control system comprising a feedback controller 1 for determining an operation amount u in a control-implemented system based on a command value r*, a detection value y of the control-implemented system and phase information θ for the control-implemented system, wherein the feedback controller 1 has a periodic disturbance suppression controller 4 for outputting a periodic disturbance compensation signal $r_{pd}^*$ based on the detection value y and the phase information θ; and a resonance/disturbance suppression controller 3 for calculating the operation amount u based on the detection value y and a corrected command value r obtained by adding the periodic disturbance compensation signal $r_{pd}^*$ to the command value r*. The periodic disturbance suppression controller 4 uses a generalized periodic disturbance observer. In the control system, resonance, non-periodic disturbances and periodic disturbances are all suppressed in order to raise the system control performance.

10 Claims, 24 Drawing Sheets

(56) References Cited

U.S. PATENT DOCUMENTS

| | | | |
|---|---|---|---|
| 2012/0306411 A1* | 12/2012 | Tadano | H02P 21/05 318/400.02 |
| 2014/0039694 A1* | 2/2014 | Yamaguchi | G05D 19/02 700/280 |
| 2015/0326163 A1* | 11/2015 | Yamaguchi | H02P 21/13 318/400.02 |
| 2016/0134218 A1* | 5/2016 | Yamaguchi | H02P 21/05 318/139 |

FOREIGN PATENT DOCUMENTS

| | | |
|---|---|---|
| JP | 5088414 B2 | 12/2012 |
| WO | 2015/136626 A1 | 9/2015 |

* cited by examiner

FEEDBACK CONTROL SYSTEM WITH PERIODIC DISTURBANCE SUPPRESSION AND RESONANCE/DISTURBANCE SUPPRESSION USING μ-SYNTHESIS

CROSS-REFERENCE TO RELATED APPLICATIONS

This application is the National Stage entry of PCT/JP2017/010427, filed on Mar. 15, 2017, which claims priority to Japanese Application No. 2016-126129, filed on Jun. 27, 2016, which are incorporated herein by reference in their entireties.

TECHNICAL FIELD

The present invention relates to a control method for suppressing resonance and disturbances in a system while simultaneously suppressing periodic disturbances.

BACKGROUND ART

Patent Document 1 relates to a control method for suppressing periodic disturbances. Patent Document 1 discloses a method for suppressing torque ripples, which are periodic disturbances, in an electric motor, by means of a "periodic disturbance observer method".

Patent Documents 2 and 3 achieve stable and high-speed control by suppressing resonance and disturbances by means of robust control using μ-synthesis. In particular, the structure of a dynamo motor (engine bench system) drive power measurement device is described.

The present invention simultaneously achieves resonance suppression and periodic disturbance suppression in a system. Herebelow, the invention will be explained by describing the case of a multi-inertia motor drive system such as a dynamometer system, but the possible applications are not limited thereto. For example, in the case of an electric power grid system, the invention can simultaneously achieve grid resonance suppression and harmonics suppression.

The resonance and disturbances that occur in a control system not only reduce the control performance, but also cause the system to become unstable. When system resonance and disturbances cannot be adequately reduced by means of structural measures due to restrictions on structure, specs, cost or the like, it has been common, for a long time, to implement resonance suppression control and disturbance suppression control.

Disturbances include "non-periodic disturbances" that occur in all frequency bands, such as white noise, and "periodic disturbances" that occur periodically in specific frequency components. For example, in the case of a motor, torque ripples correspond to periodic disturbances, and in the case of an electric power grid, harmonics and the like correspond to periodic disturbances. In particular, since periodic disturbances occur repeatedly in specific frequency components, if they match the resonance frequency of the system, they can be amplified to become extremely large disturbances, in which case they will have a serious impact on failure and instability in the system.

As a general method for suppressing disturbances, disturbance observers are widely used. Disturbance observers estimate disturbances by using command values and inverse properties of a control-implemented model, and remove the disturbances by subtracting the estimated disturbances from the command values.

However, the inverse properties of the control-implemented model generally have derivative elements, so a low-pass filter is used for preventing gain amplification in high frequency bands and forming pseudo-derivatives. There is a problem in that disturbances in some frequency bands cannot be estimated and removed due to the presence of this low-pass filter.

For example, the torque ripples in a three-phase motor are periodic disturbances that occur in synchronization with the rotation speed, and are known to occur mainly at multiples of 6×n of the rotation speed. As the rotation speed becomes higher, the frequency components of the torque ripples also become higher and enter into the control band, in which the periodic disturbances cannot be adequately suppressed by disturbance observers. Furthermore, when there is a system resonance frequency in a high frequency band, the periodic disturbances are amplified, generating extremely large vibrations and noise.

Patent Document 1 focuses on the periodicity of periodic disturbances, and discloses a "periodic disturbance observer method" in which the disturbance observer is generalized in a rotating coordinate system that is synchronized with the torque ripple frequency.

In this method, the control system only affects periodic disturbances in specific frequency components, and does not include derivative properties in the inverse properties of the control-implemented model, so the method can be used to suppress periodic disturbances even in high frequency bands. However, it cannot be used to suppress non-periodic disturbances outside the specific frequency components. Therefore, for example, if there is a non-periodic disturbance at the same frequency as the system resonance frequency, the effects thereof cannot be removed, so it is necessary to combine said method with other measures for suppressing non-periodic disturbances.

Patent Documents 2 and 3 use robust control by means of μ-synthesis as an example of a resonance/disturbance suppression method. With such robust control, the resonance and disturbances in systems are suppressed comprehensively, and the controller is designed to achieve a command value response and disturbance response that are desired.

However, when perturbations in various parameters over a wide range of frequency bands are taken into consideration, the design tends to become conservative. Additionally, in accordance with Bode's theorem, there is a tradeoff between the resonance suppression performance and the quickness of the command value response and the disturbance response. For this reason, there are cases in which the disturbance response properties near the resonance frequency exceed 0 dB, and if there is a large periodic disturbance at that frequency, the resonance may not be able to be adequately suppressed.

As indicated above, a problem in control systems is the matter of how resonance, non-periodic disturbances and periodic disturbances can all be suppressed in order to raise the system control performance.

RELATED ART

Patent Documents

Patent Document 1: JP 5088414 B
Patent Document 2: JP 2003-121308 A
Patent Document 3: JP 2003-149085 A

SUMMARY OF INVENTION

The present invention is proposed in consideration of the aforementioned conventional problem, and in one embodiment thereof, is characterized by being a control system comprising a feedback controller for determining an operation amount in a control-implemented system based on a command value, a detection value of the control-implemented system, and phase information for the control-implemented system, wherein the feedback controller has a periodic disturbance suppression controller for outputting a periodic disturbance compensation signal based on the detection value and the phase information; and a resonance/disturbance suppression controller for calculating the operation amount based on the detection value and a corrected command value obtained by adding the periodic disturbance compensation signal to the command value; and the periodic disturbance suppression controller uses a generalized periodic disturbance observer.

Additionally, one embodiment thereof is characterized in that the resonance/disturbance suppression controller has a μ-synthesis controller for adding an output obtained by subjecting the command value to transfer properties of the μ-synthesis controller, from the command value to the operation amount, to an output obtained by subjecting the detection value to the transfer properties of the μ-synthesis controller, from the detection value to the operation amount, and outputting the operation amount; and the periodic disturbance suppression controller has a frequency component extractor for extracting a frequency component from the detection value by using an nth-order rotational phase obtained by multiplying a suppression target order number n with the phase information, and outputting an nth-order frequency component vector of periodic disturbances converted to $d_n q_n$ rotating coordinates; a speed converter for calculating an nth-order rotational frequency by differentiating the nth-order rotational phase; an inverse model multiplication unit for determining an nth-order frequency component vector of an operation amount estimate value by multiplying, with the nth-order frequency component vector of the periodic disturbances, an inverse model to which a single frequency vector synchronized with the nth-order rotational frequency is applied; a first subtractor for subtracting, from the nth-order frequency component vector of the operation amount estimate value, a value obtained by passing an nth-order frequency component vector of a periodic disturbance compensation value through a low-pass filter, and outputting an nth-order frequency component vector of a periodic disturbance estimate value; a second subtractor for subtracting, from an nth-order frequency component vector of a periodic disturbance command value, the nth-order frequency component vector of the periodic disturbance estimate value, and outputting the nth-order frequency component vector of the periodic disturbance compensation value; and a compensation signal synthesis unit for restoring the nth-order frequency component vector of the periodic disturbance compensation value from the $d_n q_n$ rotating coordinate system synchronized with the periodic disturbances to a time waveform by using the nth-order rotational phase, and outputting the periodic disturbance compensation signal.

Additionally, one embodiment thereof is characterized in that the detection value used in the frequency component extractor is a value that has been passed through a high-pass filter.

Additionally, one embodiment thereof is characterized in that the resonance/disturbance suppression controller has a μ-synthesis controller for adding an output obtained by subjecting the command value to transfer properties of the μ-synthesis controller, from the command value to the operation amount, to an output obtained by subjecting the detection value to the transfer properties of the μ-synthesis controller, from the detection value to the operation amount, and outputting the operation amount; and the periodic disturbance suppression controller has a frequency component extractor for extracting a frequency component from a deviation obtained by subtracting the detection value from the command value using an nth-order rotational phase obtained by multiplying a suppression target order number n with the phase information, and outputting an nth-order frequency component vector of periodic disturbances converted to $d_n q_n$ rotating coordinates; a speed converter for calculating an nth-order rotational frequency by differentiating the nth-order rotational phase; an inverse model multiplication unit for determining an nth-order frequency component vector of an operation amount estimate value by multiplying, with the nth-order frequency component vector of the periodic disturbances, an inverse model to which a single frequency vector synchronized with the nth-order rotational frequency is applied; an adder for adding the nth-order frequency component vector of the operation amount estimate value to the value of the nth-order frequency component vector of a periodic disturbance compensation value that has been passed through a low-pass filter, and outputting the nth-order frequency component vector of the periodic disturbance compensation value; and a compensation signal synthesis unit for restoring the nth-order frequency component vector of the periodic disturbance compensation value from the $d_n q_n$ rotating coordinate system synchronized with the periodic disturbances to a time waveform based on the nth-order rotational phase, and outputting the periodic disturbance compensation signal.

Additionally, one embodiment thereof is characterized in that the resonance/disturbance suppression controller has a μ-synthesis controller for adding an output obtained by subjecting the command value to transfer properties of the μ-synthesis controller, from the command value to the operation amount, to an output obtained by subjecting the detection value to the transfer properties of the μ-synthesis controller, from the detection value to the operation amount, and outputting the operation amount; and the periodic disturbance suppression controller has a frequency component converter for outputting an nth-order frequency component vector of periodic disturbances obtained by converting, to $d_n q_n$ rotating coordinates, deviation obtained by subtracting the detection value from the command value using an nth-order rotational phase obtained by multiplying a suppression target order number n with the phase information; a speed converter for calculating an nth-order rotational frequency by differentiating the nth-order rotational phase; an inverse model multiplication unit for determining an nth-order frequency component vector of an operation amount estimate value by multiplying, with the nth-order frequency component vector of the periodic disturbances, an inverse model to which a single frequency vector synchronized with the nth-order rotational frequency is applied; an adder for integrating the nth-order frequency component vector of the operation amount estimate value, and outputting the nth-order frequency component vector of the periodic disturbance compensation value; and a compensation signal synthesis unit for restoring the nth-order frequency component vector of the periodic disturbance compensation value from the $d_n q_n$ rotating coordinate system synchronized with the periodic disturbances to a time waveform based on the nth-order rotational phase, and outputting the periodic disturbance compensation signal.

Additionally, one embodiment thereof is characterized by having a low-frequency torque controller for outputting a direct current ("DC") torque component command value based on the command value and the detection value; wherein a value obtained by adding the DC torque component command value to the periodic disturbance compensation signal is used as the corrected command value; and the low-frequency torque controller comprises a proportional-integral ("PI") controller and a low-pass filter.

Additionally, one embodiment thereof is characterized by having multiple periodic disturbance suppression controllers having different suppression target order numbers, wherein a value obtained by summing the outputs of each of the periodic disturbance suppression controllers is used as the periodic disturbance compensation signal.

Additionally, another embodiment is characterized by being a control system comprising a torque controller that calculates an inverter torque command value for an inverter based on a torque command value, a torque detection value, and phase information for a motor driven by the inverter, wherein the torque controller has a periodic disturbance suppression controller for outputting a periodic disturbance compensation signal based on the torque detection value and the phase information; and a resonance/disturbance suppression controller for calculating the inverter torque command value based on the torque detection value and a corrected torque command value obtained by adding the periodic disturbance compensation signal to the torque command value; and the periodic disturbance suppression controller uses a generalized periodic disturbance observer.

According to the present invention, resonance, non-periodic disturbances, and periodic disturbances can all be suppressed in order to raise the system control performance in a control system.

MODES FOR CARRYING OUT THE INVENTION

In the present specification, a means for combining a method for suppressing resonance and non-periodic disturbances, such as by $H_\infty$ control or µ-synthesis, with a synchronized disturbance control method using a periodic disturbance observer will be described.

In the present specification, µ-synthesis will be used as an example of a resonance suppression control method, but the resonance suppression method is not limited thereto, and other examples include resonance ratio control and $H_\infty$ control. The invention can be adapted to any method as long as the closed-loop transfer properties after resonance suppression can be recognized.

Figure 1:
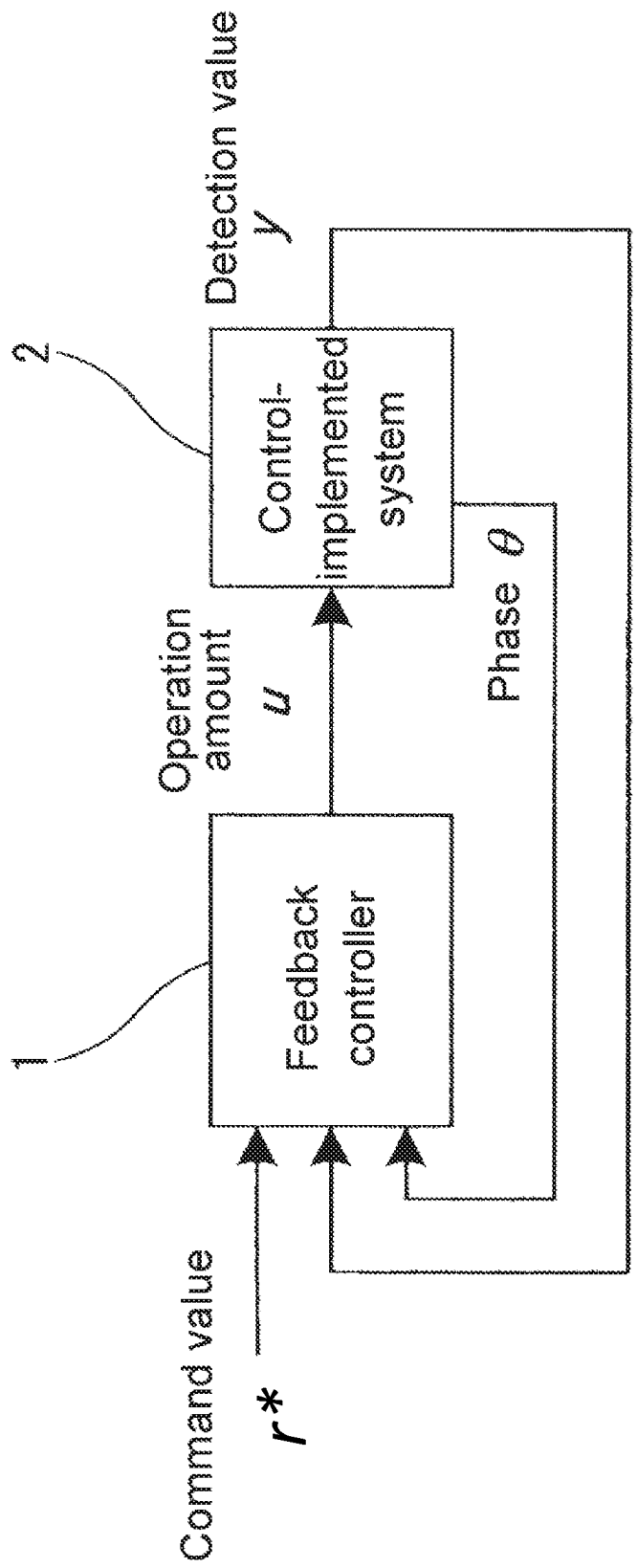
FIG. 1 is a basic configuration diagram of a feedback control system.

The present invention is a control method that is applicable to various types of systems, so the basic configuration diagram is the general feedback control system shown in FIG. 1. The command value r*, the detection value y and phase information θ for controlling periodic disturbances that cause problems in the system are inputted to the feedback controller 1. The operation amount u that is computed by the feedback controller 1 is inputted to the control-implemented system 2.

Actual control-implemented systems 2 sometimes have resonance properties, and disturbances may be included in the operation amount u or the detection amount y. Additionally, even among disturbances, periodic disturbances that occur periodically as a result of system properties can easily affect control performance and stability.

Such periodic disturbances occur periodically in accordance with the activity of the control-implemented system 2, so phase information θ for detecting the periodicity thereof is returned to the feedback controller 1.

Figure 2:
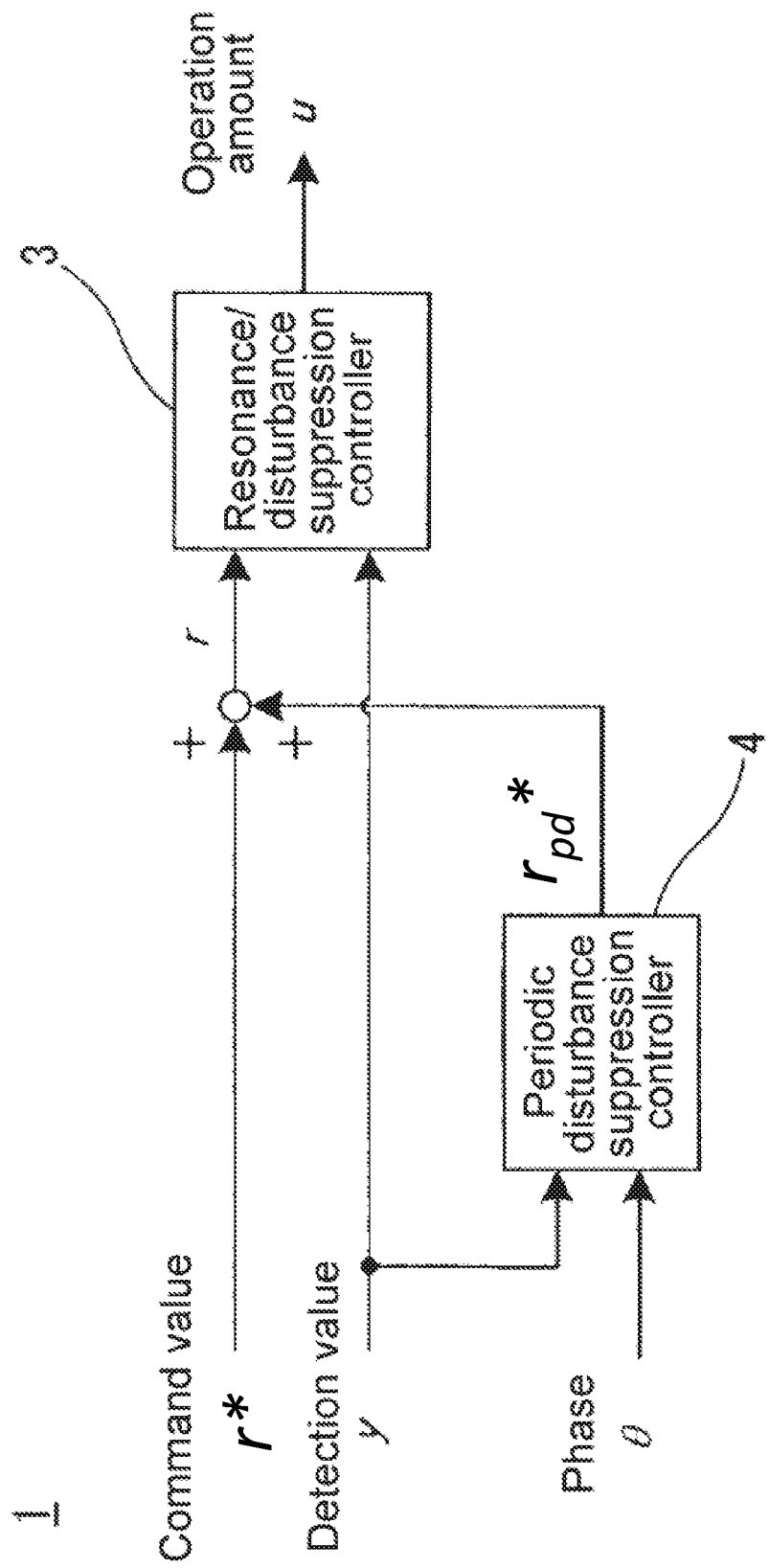
FIG. 2 is a basic configuration diagram of a feedback controller.

FIG. 2 shows an example of the configuration of a feedback controller 1. The resonance/disturbance suppression controller 3 implements feedback control based on the detection value y and a corrected command value r to be explained below. In the present invention, resonance suppression control or disturbance suppression control is also implemented, taking into consideration the case in which the control-implemented system 2 has resonance properties.

For example, a proportional-integral-derivative ("PID") controller combined with a disturbance observer or the like, resonance ratio control, and robust control such as $H_\infty$ control or µ-synthesis is contemplated, but these resonance suppression methods are not limited, and any method for suppressing resonance and disturbances may be used. What is important in the present invention is the closed-loop frequency transfer properties from the command value to the detection value obtained as a result of resonance control.

The primary purpose of the present invention is to apply these resonance-controlled closed-loop transfer properties to the generalized periodic disturbance observer model explained below.

The periodic disturbance suppression controller 4 uses the phase information θ to extract periodic disturbances included in the detection value y, and suppresses the periodic disturbances separately by the frequency component. As the method for doing so, the generalized periodic disturbance observer proposed in Patent Document 1 etc. is used. If only the method of Patent Document 1 is applied to a resonance system, periodic disturbances can be suppressed, but resonance suppression and the suppression of non-periodic disturbances is not possible.

Therefore, the present invention simultaneously achieves resonance suppression control, non-periodic disturbance suppression control and periodic disturbance suppression control. A periodic disturbance compensation signal $r_{pd}{}^*$ obtained by the periodic disturbance suppression controller 4 is added to a command value r* and inputted, as a corrected command value r, to the resonance/disturbance suppression controller 3.

Figure 3:
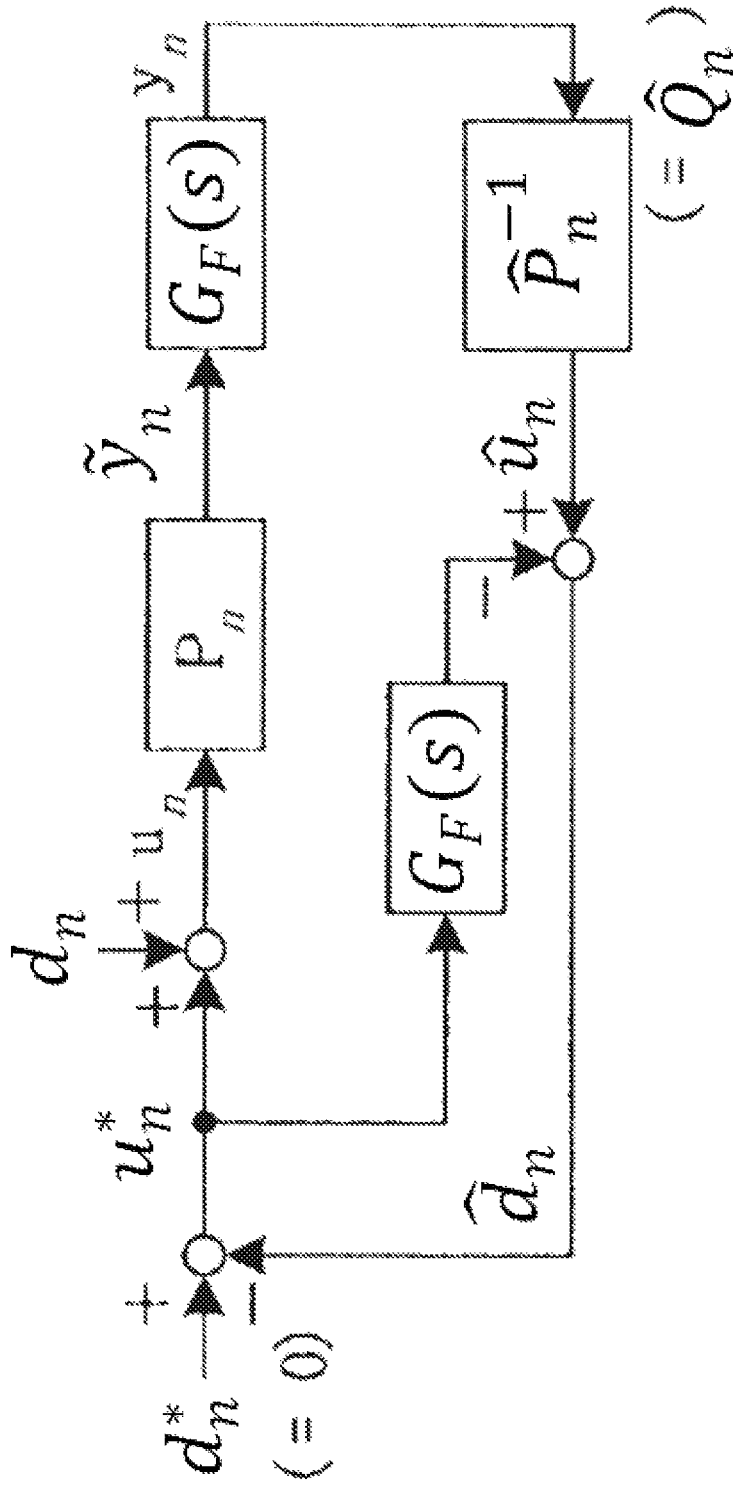
FIG. 3 is a diagram showing a generalized periodic disturbance observer.

Here, the generalized periodic disturbance observer will be briefly explained. FIG. 3 is an example of the basic configuration of a generalized periodic disturbance observer.

Figure 4:
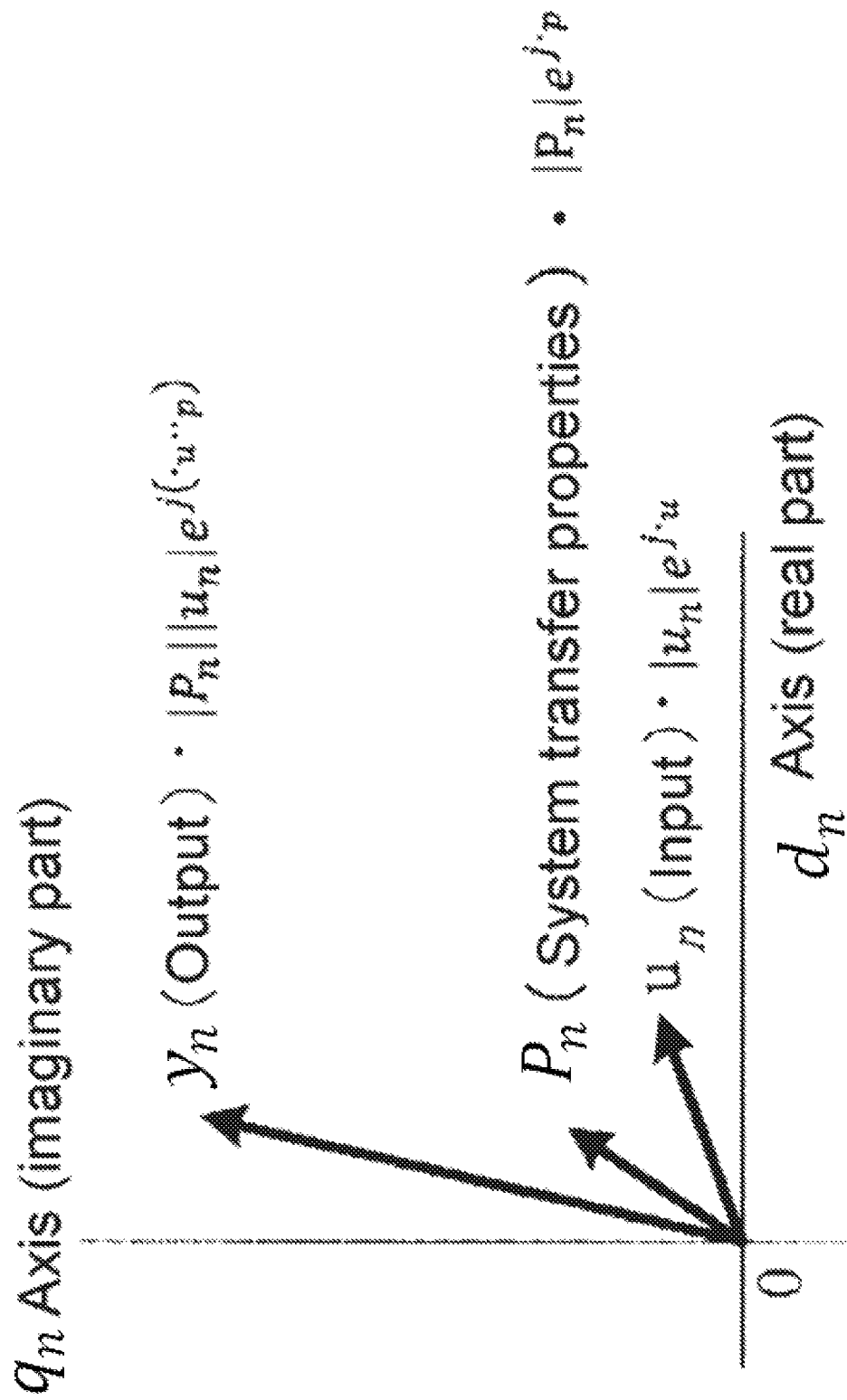
FIG. 4 is a complex vector expression of a specific frequency component.

Since periodic disturbances are disturbances that occur at a specific frequency, a suppression control system is constructed by extracting that frequency component. In this case, when a $d_n q_n$ rotating coordinate system synchronized with periodic disturbances at an nth-order frequency is defined, the input signal (operation amount) u, and the output signal (detection value) $y_n$ of the system transfer properties $P_n$, and the system transfer properties $P_n$ therebetween, can be expressed as a one-dimensional complex vector (the real part being represented by the $d_n$ axis and the imaginary part being represented by the $q_n$ axis), as indicated in FIG. 4.

The system transfer properties $P_n$ are expressed by Expression (1), and indicate the transfer properties of the nth-order frequency component from the operation amount u to the detection value y. Therefore, the frequency transfer properties include all of the transfer properties, for example, of actuators, loads, sensors, lost time and the like, and this means that, by limiting the frequency to only the nth-order frequency component, the system transfer properties $P_n$ can be generalized by using a first-order complex vector.

[Expression 1]

$$P_n = P_{dn} + jP_{qn} \quad (1)$$

$P_{dn}$: $d_n$-axis component of real system: $P_{qn}$: $q_n$-axis component of real system Thus, in order to implement control in a system that is generalized with a specific frequency component, the components that are synchronized with the $d_n q_n$ rotating coordinate system are extracted from the detection value y. If the detection value y is a single-phase signal, the components are extracted on the basis of Expression 2, and if it is a three-phase signal, the components are extracted on the basis of Expression (3).

[Expression 2]

$$y_n = \begin{bmatrix} Y_{dn} \\ Y_{qn} \end{bmatrix} = 2G_F(s) \cdot \mathcal{L}[C_1 \cdot y] \quad (2)$$

where $$C_1 = \begin{bmatrix} \cos n\theta \\ \sin n\theta \end{bmatrix}, \; y_n = Y_{dn} + jY_{qn},$$

L indicates a Laplace transform, and s indicates a Laplace operator.

$Y_{dn}$: $d_n$-axis component of detection value y; $Y_{qn}$: $q_n$-axis component of detection value y

[Expression 3]

$$y = \begin{bmatrix} Y_{dn} \\ Y_{qn} \end{bmatrix} = \quad (3)$$

$$G_F(s) \cdot \mathcal{L}\left[\sqrt{\frac{2}{3}} \begin{bmatrix} \cos n\theta & \cos\left(n\theta - \frac{2}{3}\pi\right) & \cos\left(n\theta + \frac{2}{3}\pi\right) \\ -\sin n\theta & -\sin\left(n\theta - \frac{2}{3}\pi\right) & -\sin\left(n\theta + \frac{2}{3}\pi\right) \end{bmatrix} \begin{bmatrix} y_u \\ y_v \\ y_w \end{bmatrix}\right]$$

$y_u, y_v, y_w$: three-phase detection values $G_F(s)$ indicates a low-pass filter for extracting the $d_n$-axis and $q_n$-axis components as DC values after the conversion to the $d_n q_n$ rotating coordinates by means of Expression (2) or Expression (3), and it affects both the real part and the imaginary part. i.e. both the $d_n$ axis and $q_n$ axis. For example, when the filter is a first-order filter, it can be expressed as in Expression (4).

[Expression 4]

$$G_F(s) = \frac{\omega_f}{s + \omega_f} \quad (4)$$

ωf is the low-pass filter cutoff frequency

Based on the detection value $y_n$ extracted in this way, an inverse model $Q_n\hat{\,}$ of the system transfer properties $P_n$ indicated by Expression (5) is used to calculate an operation amount estimate value $\hat{u}_n$ of the operation amount $u_n$, as shown in Expression (6).

[Expression 5]

$$\hat{Q}_n = \hat{Q}_{dn} + j\hat{Q}_{qn} = \frac{1}{\hat{P}_{dn} + j\hat{P}_{qn}} \quad (5)$$

[Expression 6]

$$\hat{u}_n = \hat{Q}_n y_n \quad (6)$$

The operation amount $u_n$ that is actually inputted to the system includes periodic disturbances $d_n$. Therefore, as indicated by Expression (7), a periodic disturbance estimate value $\hat{d}_n$ is estimated by subtracting the operation amount command value $\hat{u}_n$ that has been passed through the low-pass filter $G_F(s)$ from the operation amount estimate value $\hat{u}_n$ in Expression (6).

[Expression 7]

$$\hat{d}_n = \hat{Q}_n y_n - G_F(s) u_n^* \qquad (7)$$

By subtracting the periodic disturbance estimate value $\hat{d}_n$ in Expression (7) from the periodic disturbance command value $d_n^*$ (zero if periodic disturbances are to be suppressed), it is possible to cancel out the periodic disturbances $d_n$. The operations performed by the generalized periodic disturbance observer have been explained above with reference to FIG. 3.

The inverse model $\hat{Q}_n$ indicated by Expression (5) is a single inverse model for a specific frequency. Thus, when operating with multiple frequency components, it is necessary to prepare an inverse model for each of the frequencies. For example, in a system in which the operating frequency is variable, the frequency of the periodic disturbances will also occur at n-times the operating frequency, so the frequency component to be extracted will also be variable. In such a case, it is necessary to change the inverse model that is applied in accordance with the change in the operating frequency.

For example, if the range of frequencies that periodic disturbances may have is set to 1 to 1000 Hz and an inverse model $\hat{Q}_n$ is prepared for every 1 Hz, then it is possible to handle varying operating frequencies by providing 1000 values for each of $Q_{dn}$ and $Q_{qn}$, and reading out the frequency component synchronized to n-times the operating frequency.

However, if the system transfer properties $P_n$ are those of a resonance system, the inverse model $\hat{Q}_n$ will also include resonance properties, thus causing sudden changes in the model in response to changes in the operating frequency. In particular, when the resonance frequencies intersect, the phase properties thereof can sometimes be inverted. This does not present a problem if the correct inverse model $\hat{Q}_n$ can be immediately read out, but in an actual controller, there are phase detection delays and lost time due to calculations for digital control.

Additionally, in a generalized periodic disturbance observer, response delays occur due to closed-loop properties determined by the low-pass filter $G_F(s)$, and if the resonance frequency is inaccurate due to modeling error, in the worst case, there is a risk of entering into a state of compensation with inverse phase, and control may become unstable. Therefore, if an inverse model has sudden property changes in response to frequency changes, it is essential that there be measures for preventing destabilization.

In the present invention, in order to suppress sudden changes in the inverse model $\hat{Q}_n$, the inverse model $\hat{Q}_n$ is generated by using closed-loop transfer properties of the system including resonance suppression control properties after resonance suppression control has been implemented in a minor loop, and this inverse model $\hat{Q}_n$ is applied to the generalized periodic disturbance observer. Furthermore, since periodic disturbances are suppressed after also suppressing resonance and non-periodic disturbances, problems relating to "resonance", "non-periodic disturbances" and "periodic disturbances" can all be addressed at the same time, and this was not possible in Patent Documents 1-3.

Hereinbelow, as one embodiment, torque feedback control in a two-inertia resonance system for use in driving a motor will be described as an example.

The method of the present invention can be applied even to multiple-inertia systems such as three-inertia or higher systems, or to resonance systems other than motor driving systems. Additionally, the invention can be implemented by using a similar control configuration even for controlling parameters other than torque (e.g., speed control, position control, acceleration control, electric current control, etc.), and there is no limit on the types of command values and detection values that can be used in the feedback control system.

Figure 5:
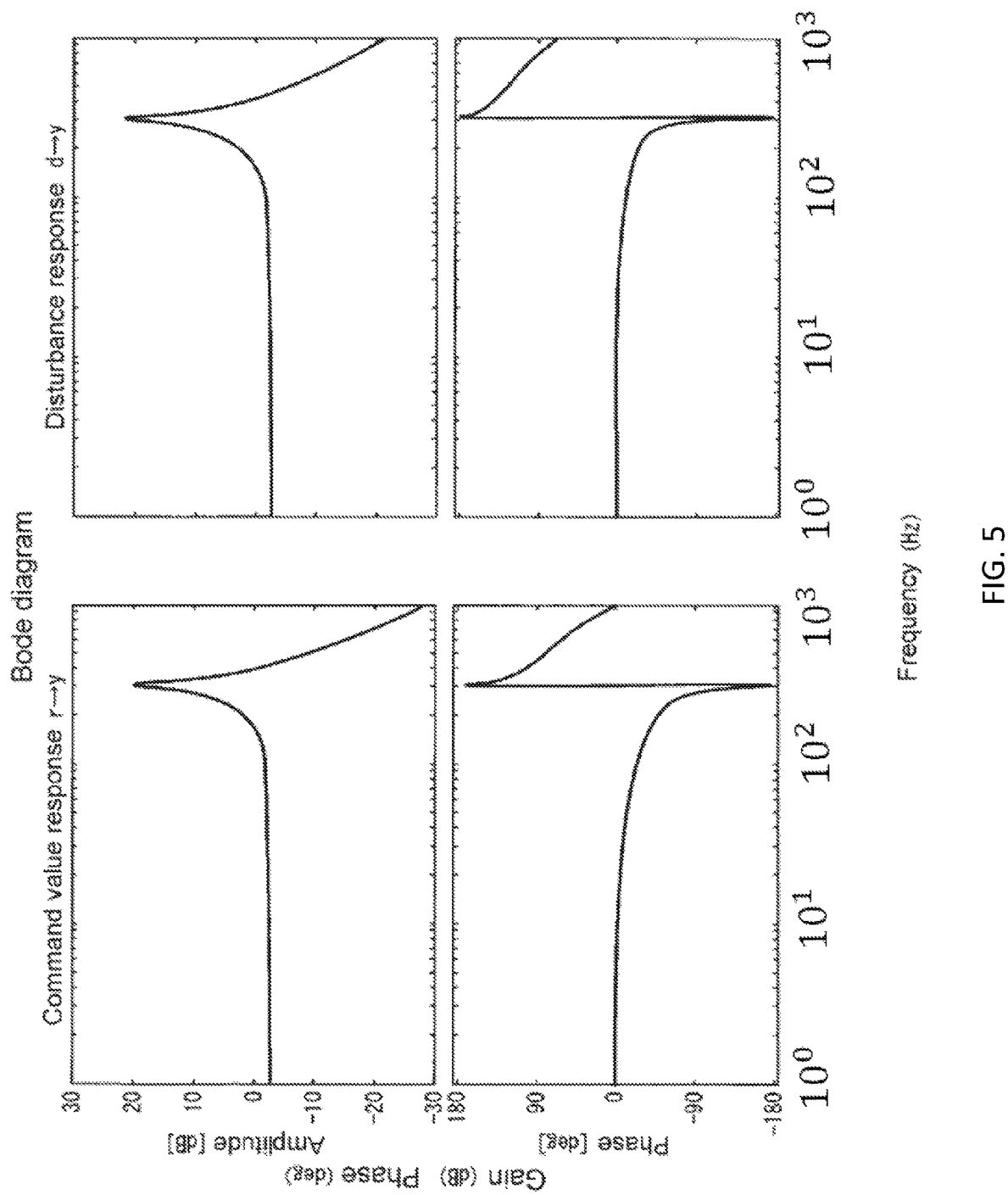
FIG. 5 is a configuration diagram showing an example of a torque feedback control system.

FIG. 5 shows a configuration diagram for implementing torque control in a two-inertia resonance-based motor-driving system as a representative example for explaining the effects of the present invention.

As an example of the device configuration, a two-inertia system including a motor M and a load L will be assumed. A torque meter 6 is installed on a coupling shaft and the torque detection value $\tau_{det}$ is fed back to a torque controller 5. In an inverter INV for driving the motor M, phase information $\theta$, rotation speed information and the like regarding the motor M are obtained by a rotation position sensor 21 or by sensorless control or the like, and said information is transferred to the torque controller 5.

The torque controller 5 calculates an inverter torque command value $\tau_{inv}^*$ on the basis of a torque command value $\tau^*$, phase information $\theta$ and the torque detection value $\tau_{det}$. The inverter INV controls the motor M by applying, to the motor M, a desired voltage based on the inverter torque command value $\tau_{inv}^*$, and the motor M drives the load L.

The position information $\theta$ or rotation speed information is used for periodic disturbance suppression control (corresponding to torque ripple suppression control in the present example) as described below.

A similar feedback control system can be formed by replacing the torque detection value $\tau_{det}$ with speed detection, position detection, electric current detection or the like, and changing the command value in accordance therewith.

Figure 6:
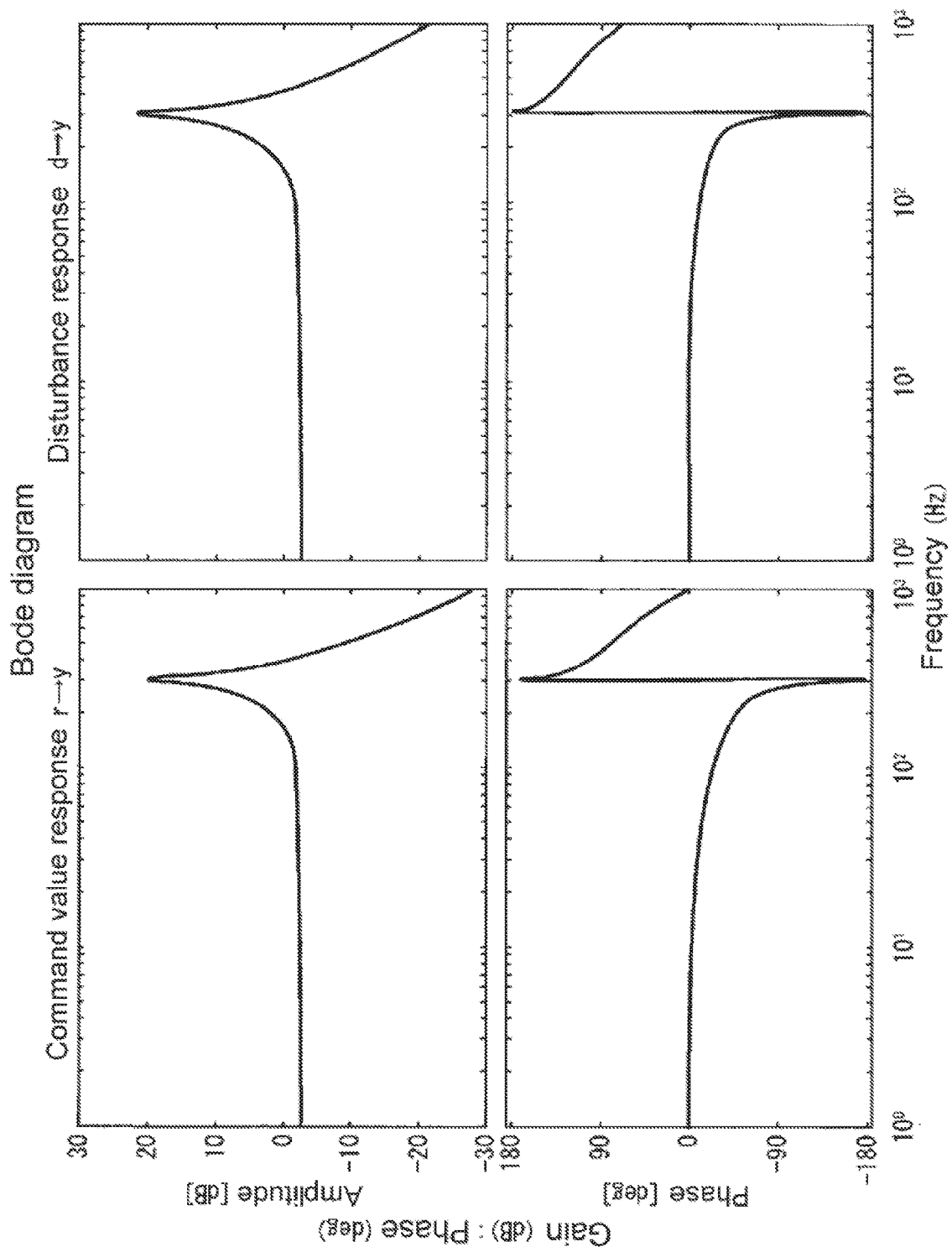
FIG. 6 is a diagram showing an example of system transfer properties (without torque control).

Additionally, the system transfer properties of the present configuration are shown in FIG. 6 as a numerical example for explaining the present invention. FIG. 6 shows the open-loop transfer properties of the system when torque control is not implemented, indicating the frequency properties from the inverter torque command value $\tau_{inv}^*$ to the torque detection value $\tau_{det}$. In low frequency bands, there is torque error (the gain (amplitude) properties from the command value to the detection value do not become 0 dB), and in high frequency bands, there is a resonance point due to the two-inertia resonance system. Additionally, although the frequency properties in FIG. 6 do not include disturbances, it is also considered that the actual torque detection value $\tau_{det}$ includes, for example, periodic disturbances such as torque ripples and non-periodic disturbances such as white noise. Such disturbances are particularly amplified at the resonance point shown in FIG. 6, and the effects thereof appear prominently in the torque detection value t.

Figure 7:
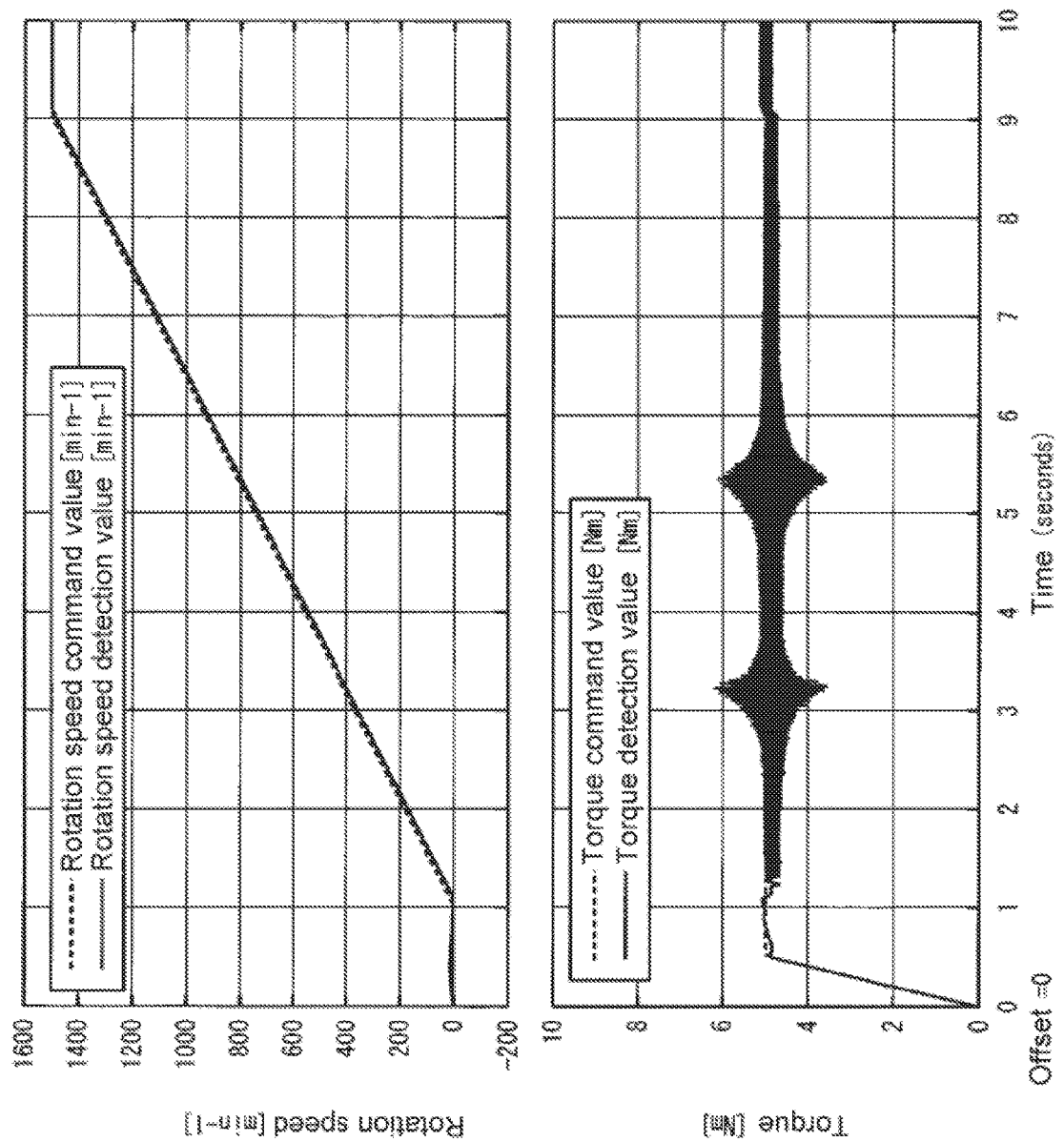
FIG. 7 is a diagram showing an example of a torque waveform (without torque feedback control).

FIG. 7 shows examples of the rotation speed and torque waveforms when not implementing torque feedback control on the properties in FIG. 6. In FIG. 7, the torque command value $\tau^*$ is a constant value (5 [Nm]) at 0.5 seconds and later.

As shown in FIG. 7, torque error and disturbances occur, and it can be seen that particularly large resonance effects occur when the torque ripple frequency and the system resonance frequency coincide while the rotation speed is increasing.

The present invention has the purpose of eliminating the torque error by reducing the gain properties to 0 dB in the low frequency region in FIG. 6, and suppressing resonance in the high frequency region, thereby simultaneously suppressing non-periodic disturbances and periodic disturbances.

Embodiment 1

Figure 8:
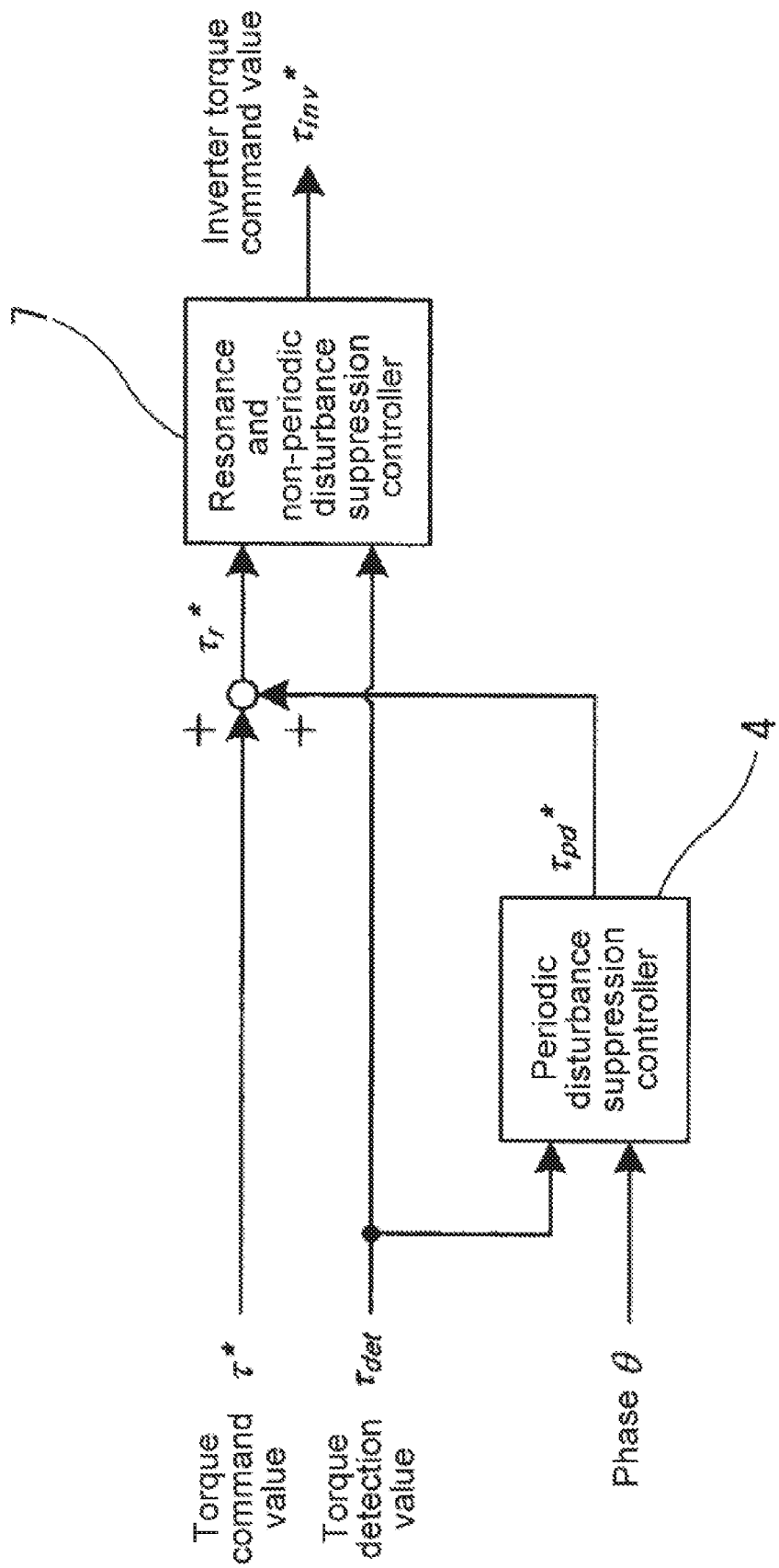
FIG. 8 is a diagram showing an example of the configuration of a torque controller.

In FIG. 8, a torque controller is shown as the control system of the present Embodiment 1.

[First Function: Resonance and Non-Periodic Disturbance Suppression Controller 7]

The resonance and non-periodic disturbance suppression controller 7 corresponds to the resonance/disturbance suppression controller 3 in FIG. 2.

In the present Embodiment 1, an example in which resonance suppression and non-periodic disturbance suppression are implemented by means of µ-synthesis using a structured specific value µ will be explained. It will be suggested here that the invention can be similarly implemented using other resonance suppression methods such as $H_\infty$ control and resonance ratio control.

Figure 9:
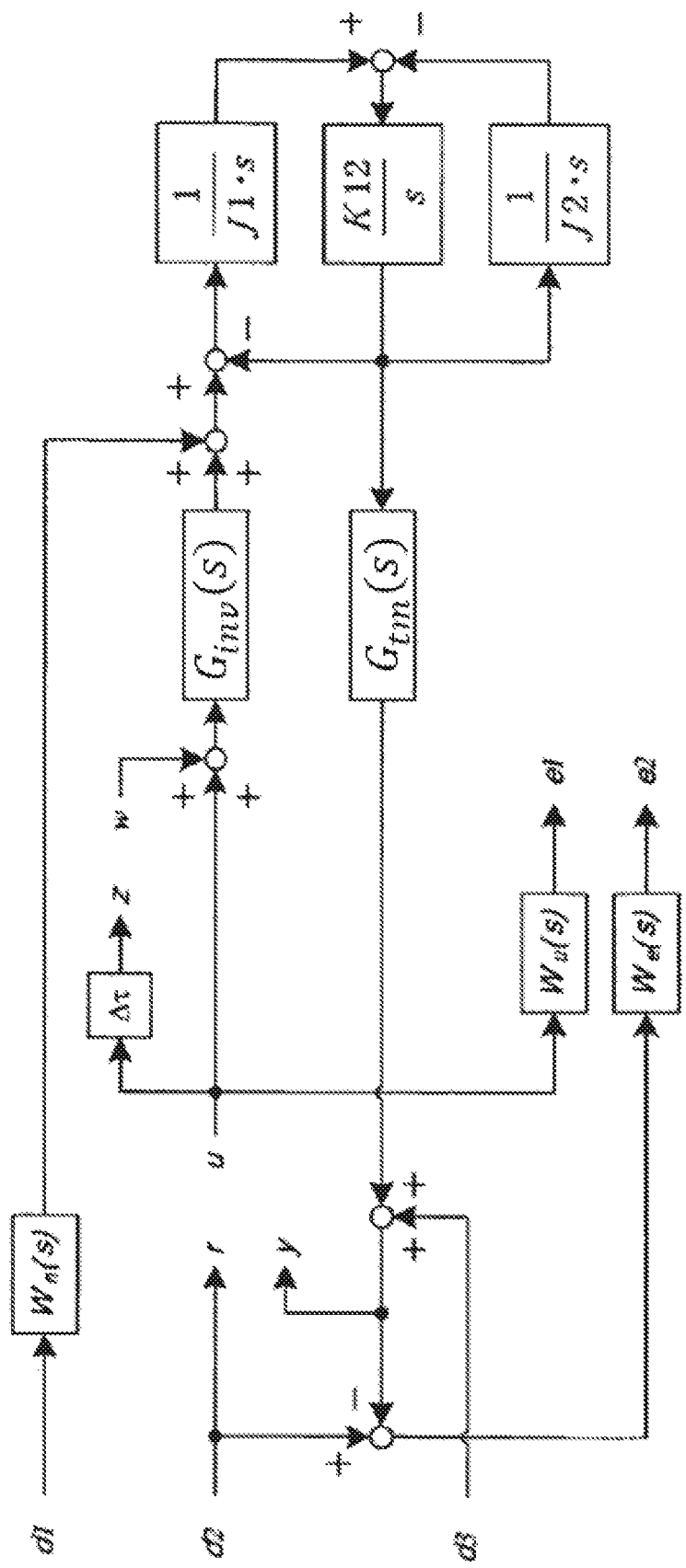
FIG. 9 is a diagram showing an example of the configuration of a generalized plant.

FIG. 9 is a configuration example of a generalized plant using µ-synthesis. Perturbations in the mechanical parameters or the like could be separately considered. However, in practice, the explicit identification of a physical model (spring/mass elements) is often omitted in favor of simplified identification based on the frequency transfer properties from the torque inputs and outputs. Therefore, in this case, a method in which the steady-state torque error (torque deviation) $\Delta\tau$ inputted from the inverter is approximated as the perturbation term to ensure robust control performance is used.

The reference signs in FIG. 9 are defined as follows:
J1, moment of inertia of motor; J2, moment of inertia of load; K12, shaft torsional rigidity; s; Laplace operator; $\Delta\tau$, steady-state torque error (torque deviation); $G_{tm}(s)$, detection response transfer function of torque meter or the like; $G_{inv}$, inverter response transfer function; d1, disturbance (including periodic disturbances); d2 and r, µ-synthesis controller input; d3, torque detection noise; z, steady-state torque error evaluation output; w, disturbance input due to steady-state torque error; u, µ-synthesis controller output (operation amount); y, observation output (detection value); e1, inverter torque command evaluation output; e2, torque deviation evaluation output; $W_n(s)$, weighting function for disturbance d1; $W_u(s)$, weighting function for inverter torque command; $W_e(s)$, weighting function for torque deviation.

The torque deviation weighting function $W_e(s)$ is a weighting for eliminating the low-frequency steady-state deviation. The inverter torque command weighting function $W_u(s)$ is set so as to reduce the high-frequency properties of the inverter torque. The disturbance d1 weighting function $W_n(s)$ is a weighting for improving the periodic disturbance and non-periodic disturbance suppression performance.

Figure 10:
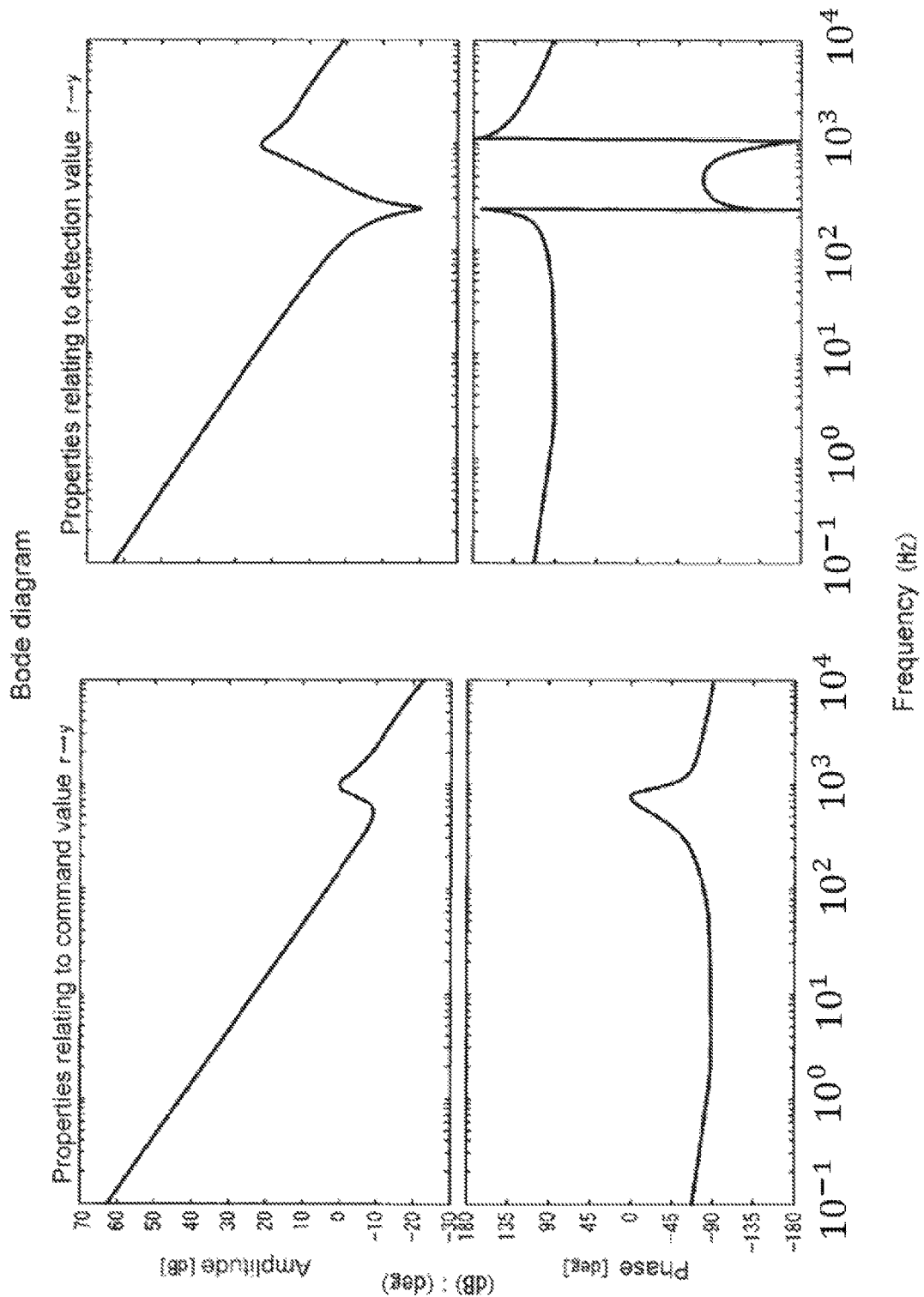
FIG. 10 is a diagram showing the properties of a µ-synthesis controller.

FIG. 10 shows the µ-synthesis controller properties obtained by implementing D-K iteration in a generalized plant configured as in FIG. 9. The upper section shows a gain diagram and the lower section shows a phase diagram. The left side shows the transfer properties Cref(s) of the µ-synthesis controller from the command value r to the operation amount u, and the right side shows the transfer properties Ctm(s) of the µ-synthesis controller from the detection value y to the operation amount u.

Figure 11:
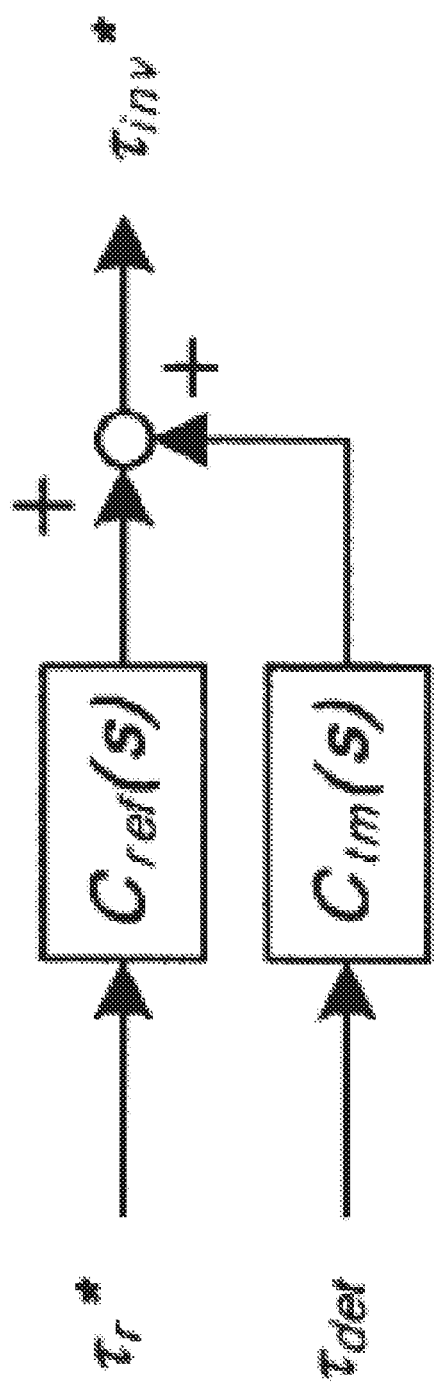
FIG. 11 is a diagram showing an example of the configuration of a µ-synthesis controller.

The µ-synthesis controller having the transfer properties Cref(s) and the transfer properties Ctm(s) designed above is installed in the resonance and non-periodic disturbance suppression controller 7 in FIG. 8 and configured as shown in FIG. 11. An output obtained by subjecting the corrected torque command value $\tau_r^*$ to the transfer properties Cref(s) is added to an output obtained by subjecting the torque detection value $\tau_{det}$ to the transfer properties Ctm(s) so as to generate an inverter torque command value $\tau_{inv}^*$.

Figure 12:
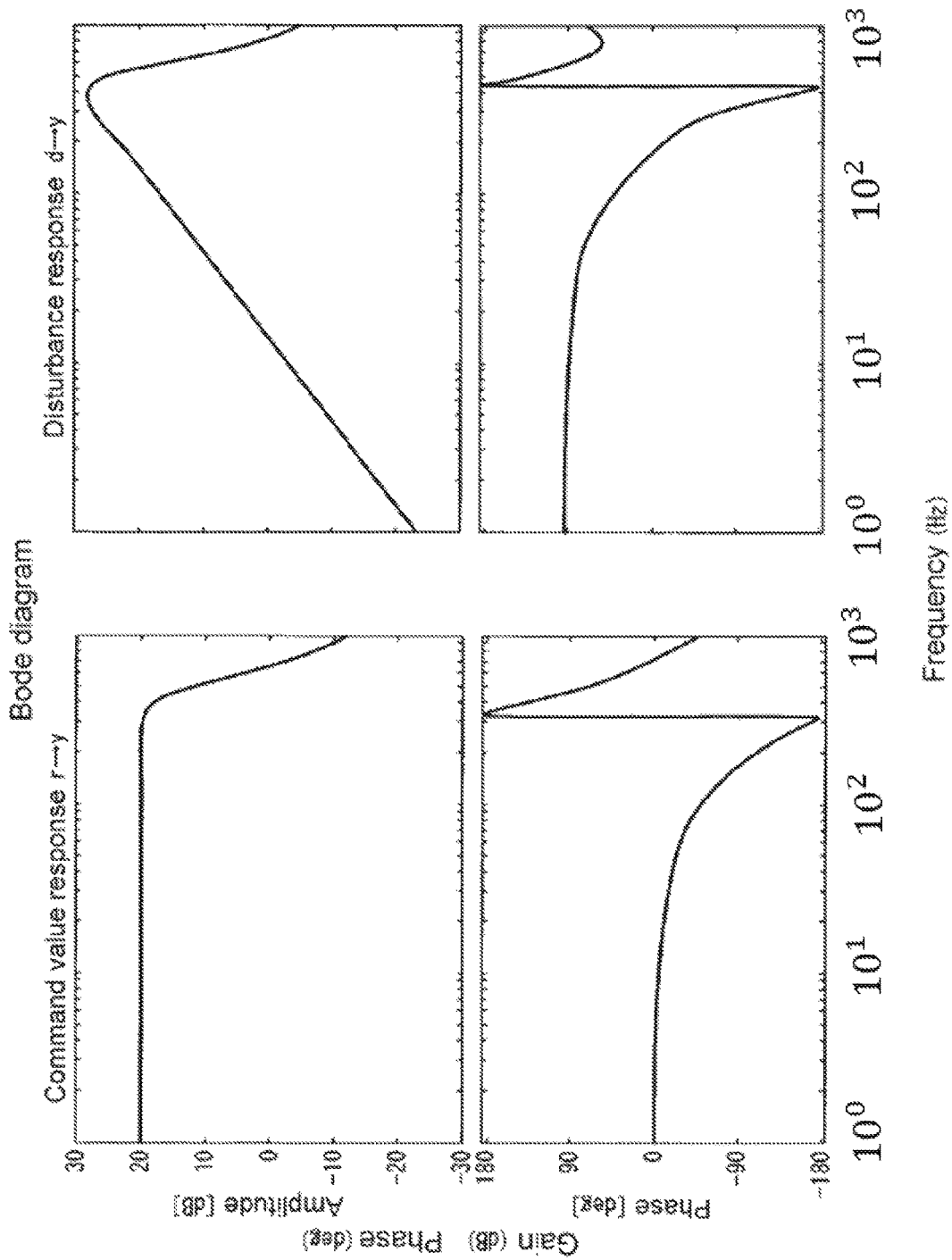
FIG. 12 is a diagram showing the closed-loop transfer properties when only resonance and non-periodic disturbance suppression control are functioning.
Figure 13:
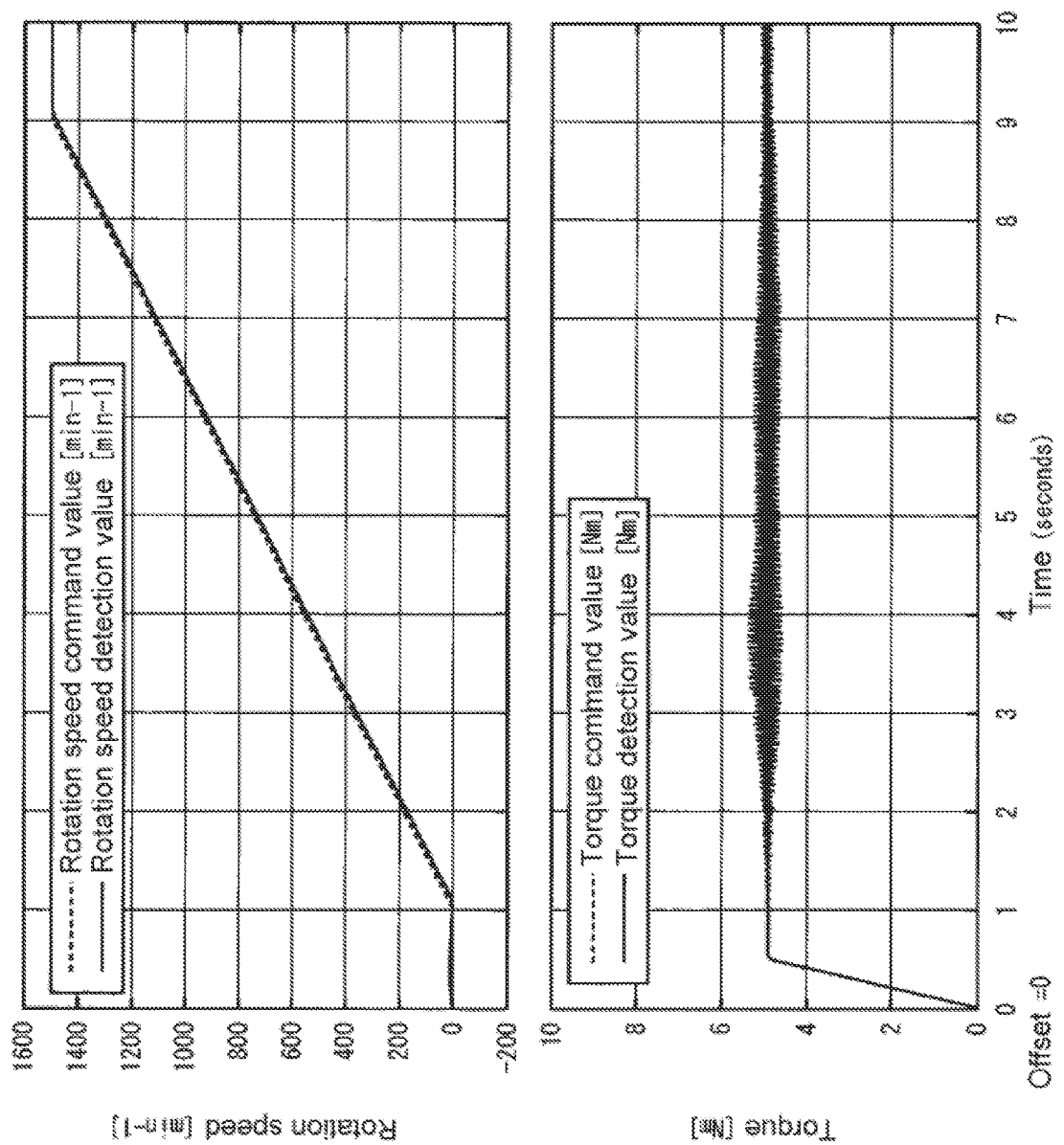
FIG. 13 is a diagram showing the torque waveform when only resonance and non-periodic disturbance suppression control are functioning.

The closed-loop transfer properties when only the resonance and non-periodic disturbance suppression controller 7 is made to function are shown in FIG. 12. Additionally, an example of the torque waveform for that case is shown in FIG. 13. In FIG. 12, the upper section shows a gain diagram and the lower section shows a phase diagram. The left side shows the closed-loop properties from the torque command value $\tau^*$ to the torque detection value $\tau_{det}$ (command value response), and the right side shows the closed-loop properties from the disturbance d1 to the torque detection value $\tau_{det}$ (disturbance response).

Compared to the torque waveform in the absence of control in FIG. 7, it can be seen, in the torque waveform in FIG. 13, that the resonance effects are significantly reduced by the effects of the resonance and non-periodic disturbance suppression controller 7. However, as can be seen by referring to the disturbance properties in FIG. 12, the closed-loop transfer properties for disturbances near the resonance frequency exceed 0 dB, so ripples remain with respect to periodic disturbances and they cannot be considered to be sufficiently removed. Regardless of the µ-synthesis method used in the present Embodiment 1, in a controller for which control is designed across all frequency bands, if any frequency band is reduced, the other frequency bands will be amplified in accordance with Bode's theorem.

Therefore, regardless of whether the design is good or bad, there are tradeoffs in the quick response and the suppression amplitude relating to the command value response and the disturbance suppression.

Thus, in the present Embodiment 1, in addition to the resonance and non-periodic disturbance suppression controller 7 mentioned above, a periodic disturbance suppression controller 8 based on a periodic disturbance observer that only affects specific frequency components is combined as a second function.

[Second Function: Periodic Disturbance Suppression Controller 8]

Figure 14:
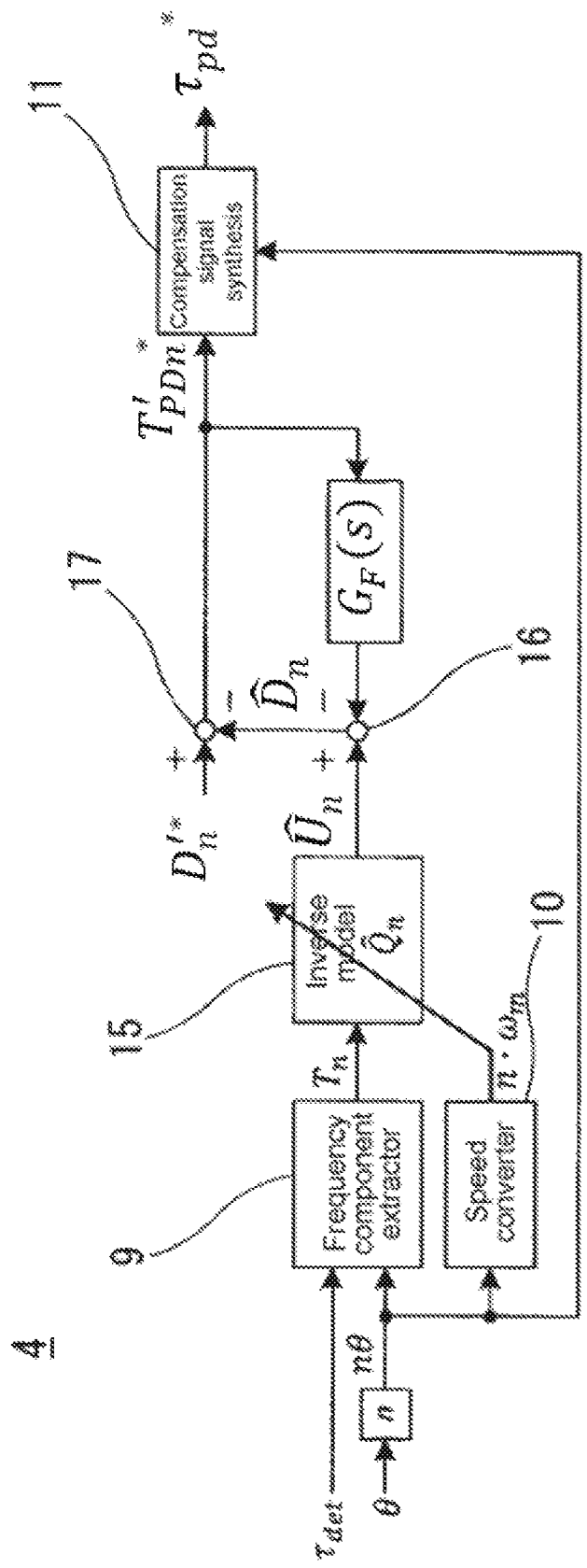
FIG. 14 is a configuration diagram of a periodic disturbance suppression controller.

FIG. 14 is a configuration diagram of the periodic disturbance suppression controller 8 in FIG. 8. In FIG. 3, the aforementioned generalized periodic disturbance observer is used. The reference signs in FIG. 14 are as follows:

$T_n$, nth-order frequency component vector of periodic disturbances (torque ripples); $U_n\hat{}$, nth-order frequency component vector of operation amount estimate value (estimate value including periodic disturbances); $D_n^*$, nth-order frequency component vector of periodic disturbance command value (normally zero when suppressed); $D_n\hat{}$, nth-order frequency component vector of periodic disturbance estimate value; $T_{PDn}^*$, nth-order frequency component vector of periodic disturbance compensation value.

First, in a frequency component extractor 9, the nth-order rotational phase $n\theta$ obtained by multiplying the periodic disturbance (torque ripple) suppression target order number n with the phase information θ is used to extract a frequency component from the torque detection value $\tau_{det}$, and converted to an nth-order frequency component vector $T_n$ of the periodic disturbances (torque ripples) in a $d_n q_n$ rotating coordinate system synchronized with the torque ripples. The conversion formula for the nth-order frequency component vector $T_n$ of the periodic disturbances becomes Expression (8) below on the basis of Expression (2).

[Expression 8]

$$T_n = \begin{bmatrix} T_{dn} \\ T_{qn} \end{bmatrix} = 2G_F(s) \cdot \mathcal{L}\left[\begin{bmatrix} \cos n\theta \\ \sin n\theta \end{bmatrix} \cdot \tau_{det}\right] \quad (8)$$

where $T_n = T_{dn} + jT_{qn}$, L indicates a Laplace transform, and s indicates a Laplace operator.

In a speed converter 10, the nth-order rotational phase $n\theta$ is differentiated to compute the nth-order rotational frequency $n^*\omega_m$. Next, in an inverse model multiplication unit 15, the inverse model $Q_n\hat{}$ is multiplied with the nth-order frequency component vector $T_n$ of the periodic disturbances calculated by Expression (8) to determine an nth-order frequency component vector $U_n\hat{}$ of the operation amount estimate value. The formula for calculating the inverse model $Q_n\hat{}$ is given in Expression (5). In this case, a single frequency component vector synchronized with the nth-order rotational frequency $n \cdot \omega_m$ is applied to the inverse model $Q_n\hat{}$. As mentioned above, the closed-loop transfer properties of the "resonance and non-periodic disturbance suppression controller 7" (i.e., the command value response in FIG. 12, the frequency transfer properties from the torque command value to the torque detection value), which is the first function, are applied, as minor loop properties, to the inverse model $Q_n\hat{}$, so resonance properties like those in FIG. 6 are not included, and a control system that is comparatively robust with respect to changes in the operating frequency, i.e., variable-speed operation, can be constructed.

Since the nth-order frequency component vector $U_n\hat{}$ of the operation amount estimate value includes periodic disturbances, an nth-order frequency component vector $D_n\hat{}$ of the frequency disturbance estimate value is calculated by subtracting the value obtained by passing the nth-order frequency component vector $T_{pDn}^*$ of the periodic disturbance compensation value through the low-pass filter $G_F(s)$ from the nth-order frequency component vector $U_n\hat{}$ of the operation amount estimate value. The reason the value is passed through a low-pass filter $G_F(s)$ is in order to match the response with that of the low-pass filter $G_F(s)$ contained in the frequency component extractor 9. Periodic disturbances can be suppressed by subtracting the estimated nth-order frequency component vector $D_n\hat{}$ of the periodic disturbance estimate value from the nth-order frequency component vector $D_n^*$ of the periodic disturbance command value, thereby calculating the nth-order frequency component vector $T_{pDn}^*$ of the periodic disturbance compensation value. When the filter is a first-order filter, the low-pass filter $G_F(s)$ is expressed by Expression (4).

In the compensation signal synthesis unit 11, the nth-order frequency component vector $T_{pDn}^*$ of the periodic disturbance compensation value generated in this manner is restored to the original time waveform from the $d_n q_n$ rotating coordinate system synchronized with the periodic disturbances on the basis of Expression (9). It is also possible to configure the invention so that there are multiple orders of n arranged in parallel, and the frequency components in each order can be summed to synthesize a periodic disturbance compensation signal $\tau_{pd}^*$.

[Expression 9]

$$\tau_{pd}^* = T_{PD}^* \cos nq + T_{PDqn}^* \sin nq \quad (9)$$

where $T_{pDn}^* = T_{PDn}^* + jT_{PDqn}^*$

By forming a periodic disturbance suppression controller 4 as described above and adding the periodic disturbance compensation signal $\tau_{pd}^*$, which is the output thereof, to the torque command value $\tau^*$ in FIG. 8, a corrected torque command value $\tau_r^*$, which becomes the new input to the resonance and non-periodic disturbance suppression controller 7, is generated. As a result thereof, in addition to the resonance and non-periodic disturbance suppression control, which is the first function, it is also possible to simultaneously achieve periodic disturbance suppression.

Figure 15:
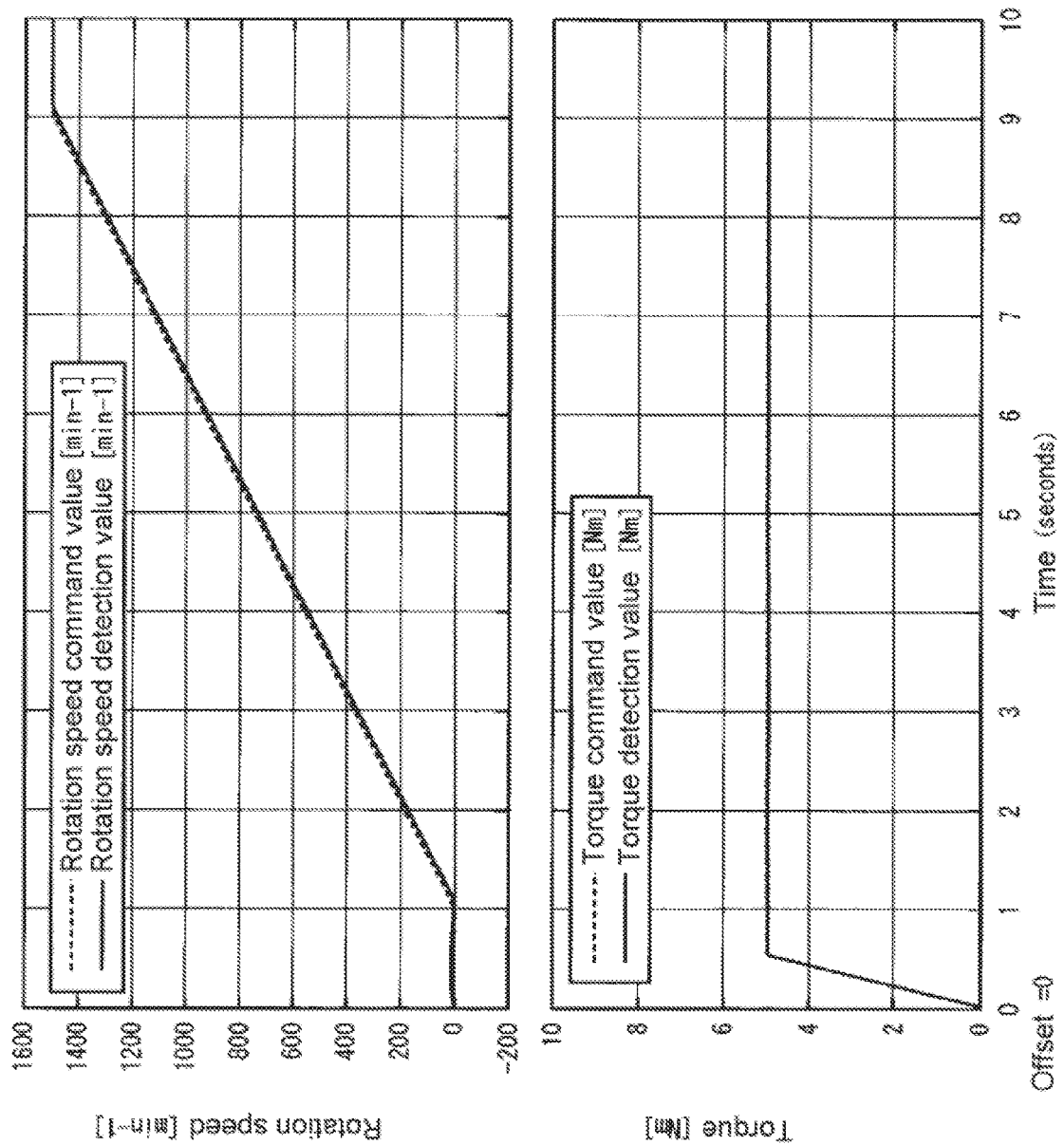
FIG. 15 is a diagram showing the torque waveform (when simultaneously suppressing resonance, non-periodic disturbances and periodic disturbances).

FIG. 15 shows an example of a torque waveform for the case in which resonance, non-periodic disturbances, and periodic disturbances are simultaneously suppressed using the configuration in FIG. 8.

Compared to FIG. 13 in which only the resonance and the non-periodic disturbances are suppressed, it can be seen that the influence of the residual periodic disturbances is removed, and torque ripples and resonance effects are further reduced. Therefore, the effects of the present Embodiment 1 can also be confirmed from numerical calculations.

In the present Embodiment 1, resonance, non-periodic disturbances, and periodic disturbances can be simultaneously suppressed. Additionally, when the present control method is applied to torque control in a motor driving system, the precision of torque control can be improved.

Embodiment 2

By extracting the periodic disturbance components from the torque detection value $\tau_{det}$ by means of Expression (8) in Embodiment 1, focusing on the terms $T_{dn} \cos nq + T_{qn} \sin nq$ included in the torque detection value $\tau_{det}$, the expression can be expanded as in Expression (10) for those frequency components.

[Expression 10]

$$\begin{cases} T_{dn} = 2G_F(s) \cdot \mathcal{L}[(T_{dn} \cos n\theta + T_{qn} \sin n\theta) \cdot \cos n\theta] \\ \quad = G_F(s) \cdot \mathcal{L}[(T_{dn} + T_{dn} \cos 2n\theta + T_{qn} \sin 2n\theta)] \\ T_{qn} = 2G_F(s) \cdot \mathcal{L}[(T_{dn} \cos n\theta + T_{qn} \sin n\theta) \cdot \sin n\theta] \\ \quad = G_F(s) \cdot \mathcal{L}[(T_{qn} - T_{qn} \cos 2n\theta + T_{qn} \sin 2n\theta)] \end{cases} \quad (10)$$

By using the low-pass filter $G_F(s)$ to remove the frequency components that are multiples of 2n occurring in $T_{dn} \cos 2n\theta + T_{qn} \sin 2n\theta$ and $T_{qn} \cos 2n\theta + T_{dn} \sin 2n\theta$ in Expression (10), it is possible to extract the nth-order frequency components $T_{dn}$ and $T_{qn}$ used in the $d_n q_n$ rotating coordinate system.

Meanwhile, if a DC torque component Tdc is included in the torque detection value $\tau_{det}$, the expression can be expanded as in Expression (11) below.

[Expression 11]

$$\begin{cases} T_{dn} = 2G_F(s) \cdot \mathcal{L}[(T_{dc} + T_{dn} \cos n\theta + T_{qn} \sin n\theta) \cdot \cos n\theta] \\ \quad = G_F(s) \cdot \mathcal{L}[(T_{dn} + T_{dn} \cos 2n\theta + T_{qn} \sin 2n\theta + 2T_{dc} \cos n\theta)] \\ T_{qn} = 2G_F(s) \cdot \mathcal{L}[(T_{dn} \cos n\theta + T_{qn} \sin n\theta) \cdot \sin n\theta] \\ \quad = G_F(s) \cdot \mathcal{L}[(T_{qn} - T_{qn} \cos 2n\theta + T_{qn} \sin 2n\theta + 2T_{dc} \sin n\theta)] \end{cases} \quad (11)$$

Comparing $T_{dn}$ cos 2nθ+$T_{qn}$ sin 2nθ+2$T_{dc}$ cos nθ and $T_{qn}$ cos 2nθ+$T_{dn}$ sin 2nθ+2$T_{dc}$ sin nθ in Expression (11) with Expression (10), it can be seen that, in addition to the frequency components at multiples of 2n that occurred in Expression (10), there are frequency components at multiples of n associated with the DC torque component Tdc. Although these may be similarly removed by using a low-pass filter $G_F(s)$, the 1n-multiple component includes a lower frequency than in the case where there are only multiples of 2n, so the cutoff frequency must be designed to be lower in order to remove that frequency with the low-pass filter $G_F(s)$.

Since the cutoff frequency of the low-pass filter $G_F(s)$ directly affects the transient response of the periodic disturbance observer, it is preferable for the cutoff frequency to be made as high as possible. However, there is a tradeoff relationship with adequately removing the influence of the aforementioned $T_{dn}$ cos 2nθ+$T_{qn}$ sin 2nθ+2$T_{dc}$ cos nθ and $T_{qn}$ cos 2nθ+$T_{dn}$ sin 2nθ+2$T_{dc}$ sin nθ.

If the cutoff frequency is too high, the influence of other frequency components may appear in the $d_n q_n$ rotating coordinate system, thereby reducing the stability of the periodic disturbance observer. On the other hand, if the cutoff frequency is too low, then the stability of the periodic disturbance observer may improve, but the quick response of the periodic disturbance suppression will be degraded, and this is particularly problematic in applications such as variable-speed operation.

In Expression (10), it is sufficient to set the cutoff frequency so as to separate the 2n-multiple components from the DC component. However, in the case of Expression (11), in which periodic disturbances that are superimposed on the DC torque component Tdc are extracted, there is a 1n-multiple component, and this 1n-multiple component must be separated from the DC torque component Tdc.

For this reason, compared to Expression (10) in which the DC torque component $T_{dc}$ is not included, the range over which the cutoff frequency can be set is restricted, and there is a possibility of lowering the performance in terms of both the quick response and the stability.

Figure 16:
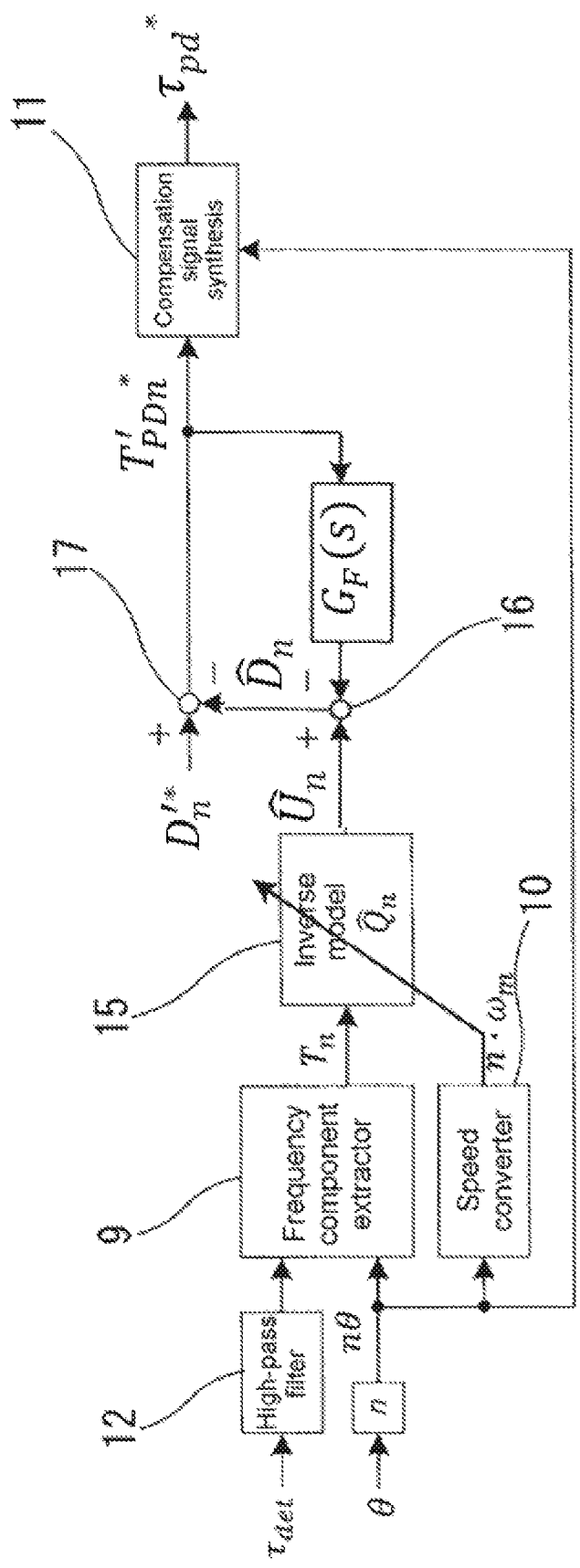
FIG. 16 is a configuration diagram of a periodic disturbance suppression controller (using a high-pass filter).

Therefore, in the present Embodiment 2, as shown in FIG. 16, the torque detection value $\tau_{det}$ including the DC torque component Tdc is passed through a high-pass filter 12, then inputted to the frequency component extractor 9 to perform a conversion equivalent to Expression (10). This high-pass filter 12 should be set to a cutoff frequency that removes the DC torque component Tdc without affecting the 2n multiple.

As mentioned above, according to the present Embodiment 2, functions and effects similar to those in Embodiment 1 are achieved. When periodic disturbance components that are superimposed on a DC torque component Tdc are to be suppressed with a generalized periodic disturbance observer, it is possible to prevent decreases in the quick response and the stability.

Embodiment 3

Figure 17:
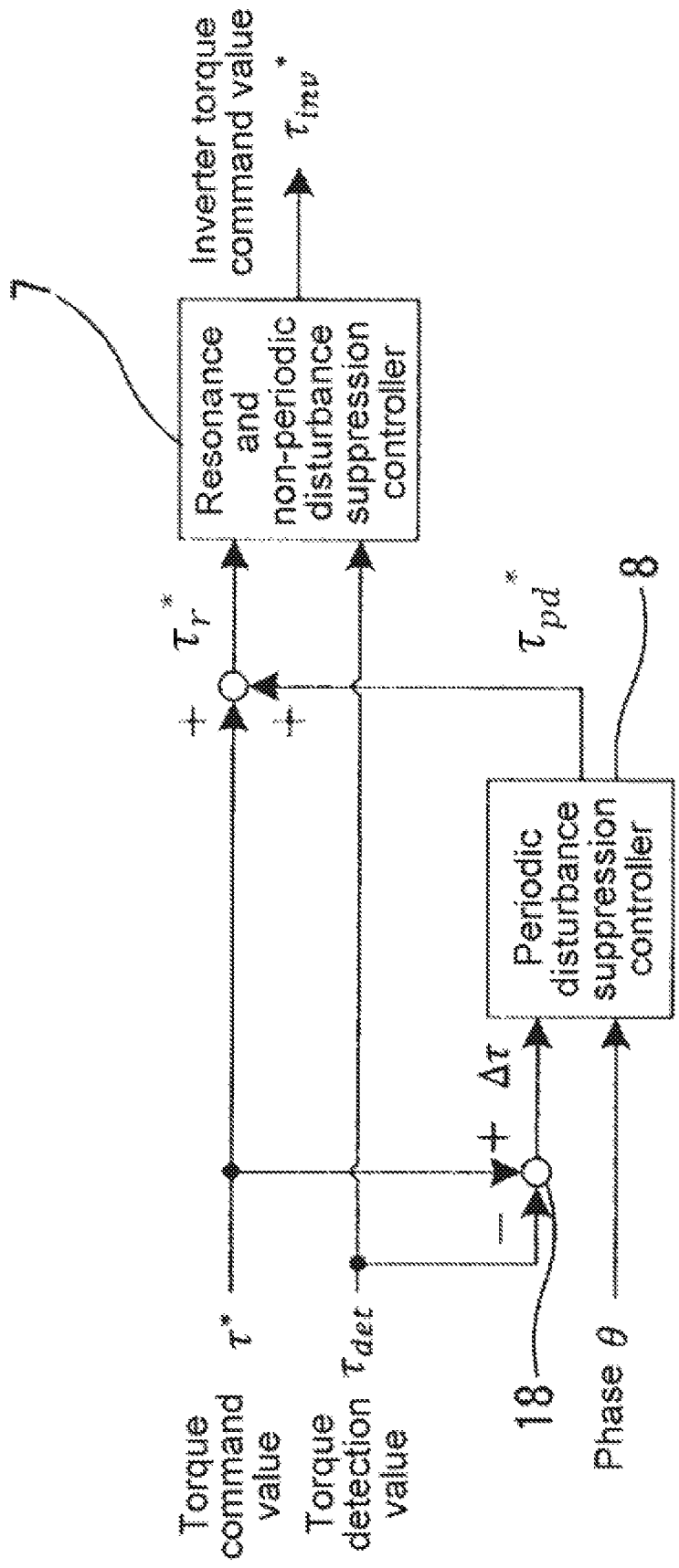
FIG. 17 is a configuration diagram for the case in which a periodic disturbance suppression controller is used for torque deviation.

As the present Embodiment 3, a method of applying a generalized periodic disturbance observer to the deviation between the command value and the detection value and suppressing periodic disturbances included in the deviation will be described. FIG. 17 is a control configuration diagram for the case in which periodic disturbance suppression control is implemented with respect to torque error.

In this case, in the periodic disturbance suppression controller 8, the torque detection value $\tau_{det}$ in FIG. 14 can be replaced by the torque deviation Δτ. Additionally, since the purpose is to eliminate torque deviation, the nth-order frequency component vector $D_n^*$ of the periodic disturbance value is set to zero.

Figure 18:
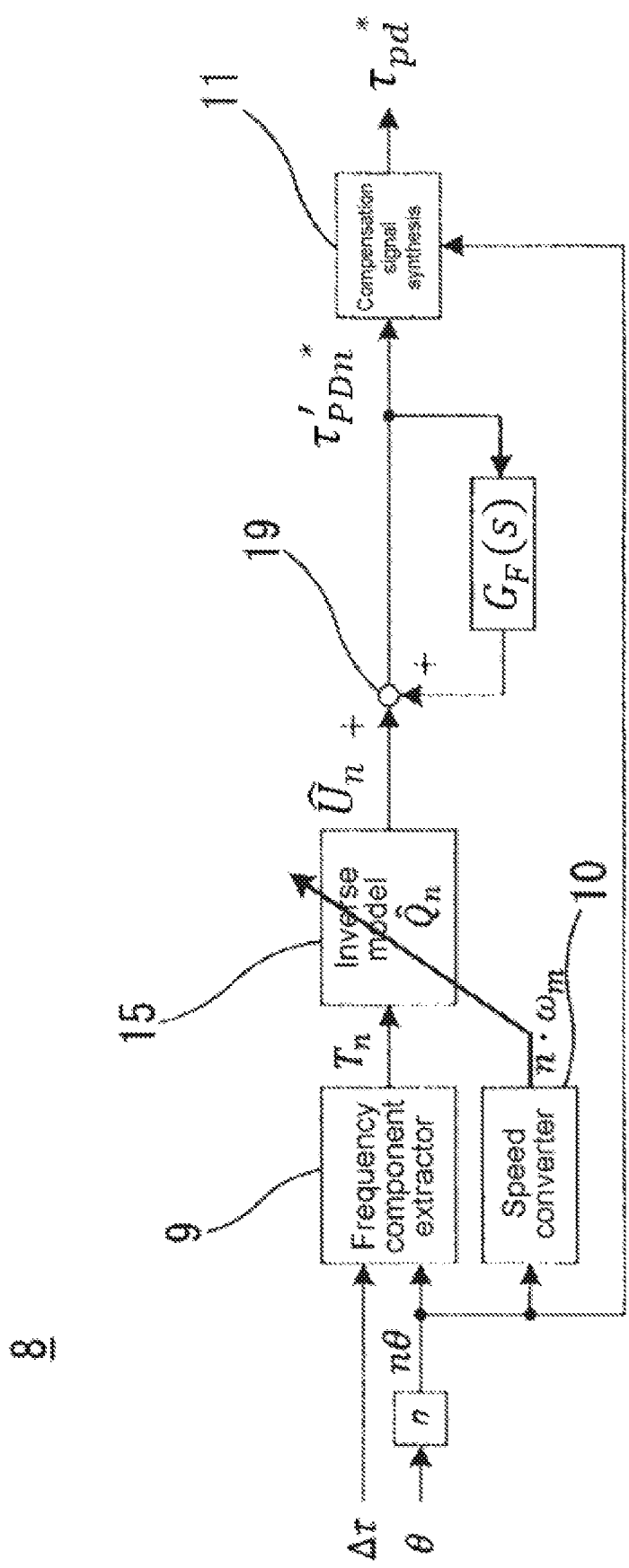
FIG. 18 is a configuration diagram of a generalized periodic disturbance observer for torque deviation.

Therefore, by converting the control block in FIG. 14 to an equivalent, it is possible to configure the periodic disturbance suppression controller 8 as in FIG. 18. As shown in FIG. 18, the subtractor 16 and 17 in FIG. 16 are omitted, and an adder 19 is provided for adding the nth-order frequency component vector $\hat{U}_n$ of the operation amount estimate value to the value of the nth-order frequency component vector $T_{pDn}^*$ of the periodic disturbance compensation value passed through the low-pass filter $G_F(s)$. Additionally, the output of the adder 19 becomes the nth-order frequency component vector $T_{pDn}^*$ of the periodic disturbance compensation value.

The nth-order frequency component vector $T_n$ of the periodic disturbances in FIG. 18 is determined by substituting Δτ for the torque detection value $\tau_{det}$ in Expression (8).

As mentioned above, according to the present Embodiment 3, functions and effects similar to those in Embodiment 1 are achieved. Additionally, as described in Embodiment 2, even when periodic disturbances are superimposed on the DC torque component Tdc, the periodic disturbance observer can be operated in a state in which the DC torque component Tdc is removed beforehand by using the torque deviation Δτ.

In other words, this embodiment has the advantage that effects similar to those in Embodiment 2 can be obtained without the need for a high-pass filter as in Embodiment 2, thereby allowing the embodiment to be realized using a more simplified control structure as in FIG. 18.

Embodiment 4

Figure 19:
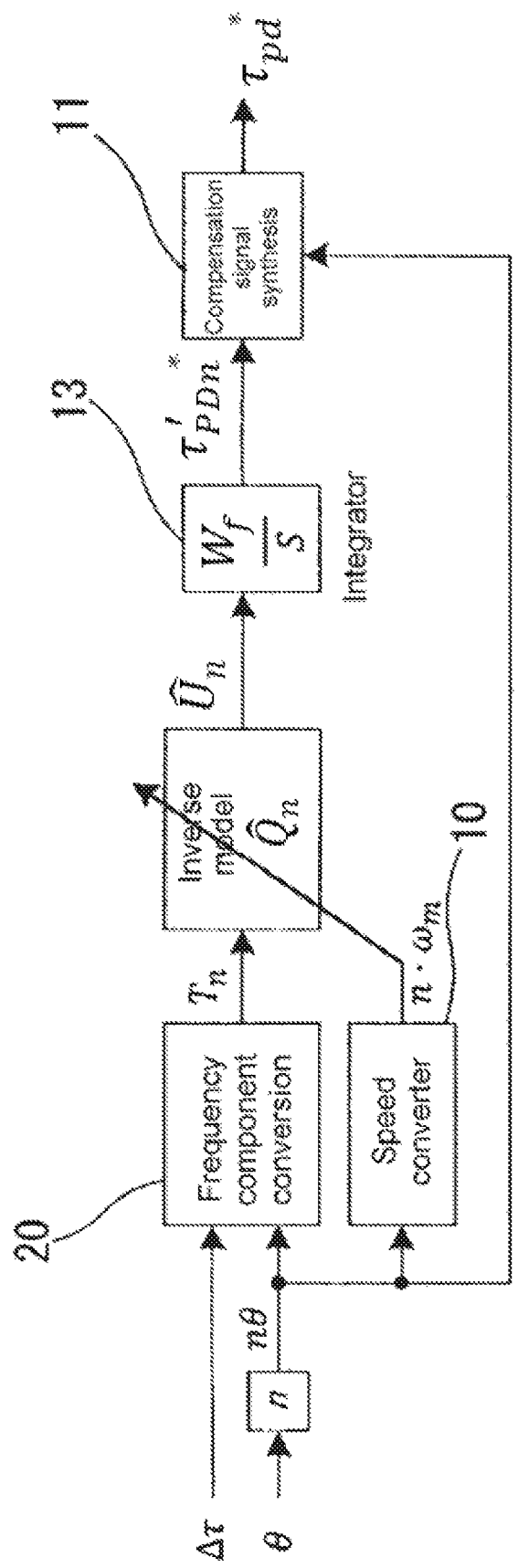
FIG. 19 is an equivalent control configuration diagram for the case in which a first low-pass filter is applied.

In the configuration of Embodiment 3 in FIG. 18, if the first-order low-pass filter indicated by Expression (12) is set as the low-pass filter $G_F(s)$ used for extracting the frequency components in the generalized periodic disturbance observer, FIG. 18 can be converted to an equivalent control block diagram as in FIG. 19.

[Expression 12]

$$G_F(s) = \frac{\omega_f}{S + \omega_f} \quad (12)$$

where ωf is the low-pass filter cutoff frequency

In FIG. 19, the frequency component extractor 9 in FIG. 18 is changed to the frequency component converter 20, and the low-pass filter $G_F(s)$ is changed to the integrator 13. In other words, the low-pass filter $G_F(s)$ that is inside the frequency component extractor 9 in FIG. 18 is moved to the outside. Furthermore, the integrator 13 is a simple integrator 13 that is obtained by combining the low-pass filter $G_F(s)$ inside the frequency component extractor 9 and a latter-stage low-pass filter $G_F(s)$, and that has a cutoff frequency of ωf and the inverse model as the gain. In this way, FIG. 18 can be equivalently converted to FIG. 19. However, the frequency component converter 20 in FIG. 19 uses the following Expression (13) instead of Expression (8).

[Expression 13]

$$T_n = 2 \cdot \begin{bmatrix} \cos n\theta \\ \sin n\theta \end{bmatrix} \cdot \Delta\tau \qquad (13)$$

Since Expression (13) does not include a low-pass filter GF(s), the nth-order frequency component vector $T_{pDn}^*$ of the periodic disturbance compensation value is directly generated without expressly extracting the frequency component of the periodic disturbances contained in the torque deviation $\Delta\tau$.

As described above, according to the present Embodiment 4, functions and effects similar to those in Embodiment 1 are achieved. Additionally, when the low-pass filter $G_F(s)$ is limited to being a first-order filter, a generalized periodic disturbance observer for the torque deviation $\Delta\tau$ can be realized with an extremely simple structure comprising a gain and an integrator, thus reducing the amount of computation involved with control.

Embodiment 5

In Embodiments 1-4 described above, in the resonance and non-periodic disturbance suppression controller 7, the controller was designed so as to implement torque control even in the low-frequency region including steady-state torque. In other words, the controller performs control across all frequency bands including resonance control in the high-frequency region. However, in general, when designing a controller that covers all frequency bands by robust control such as μ-synthesis, there is a tendency for the control performance to become conservative and for the number of orders in the controller to become larger.

Figure 20:
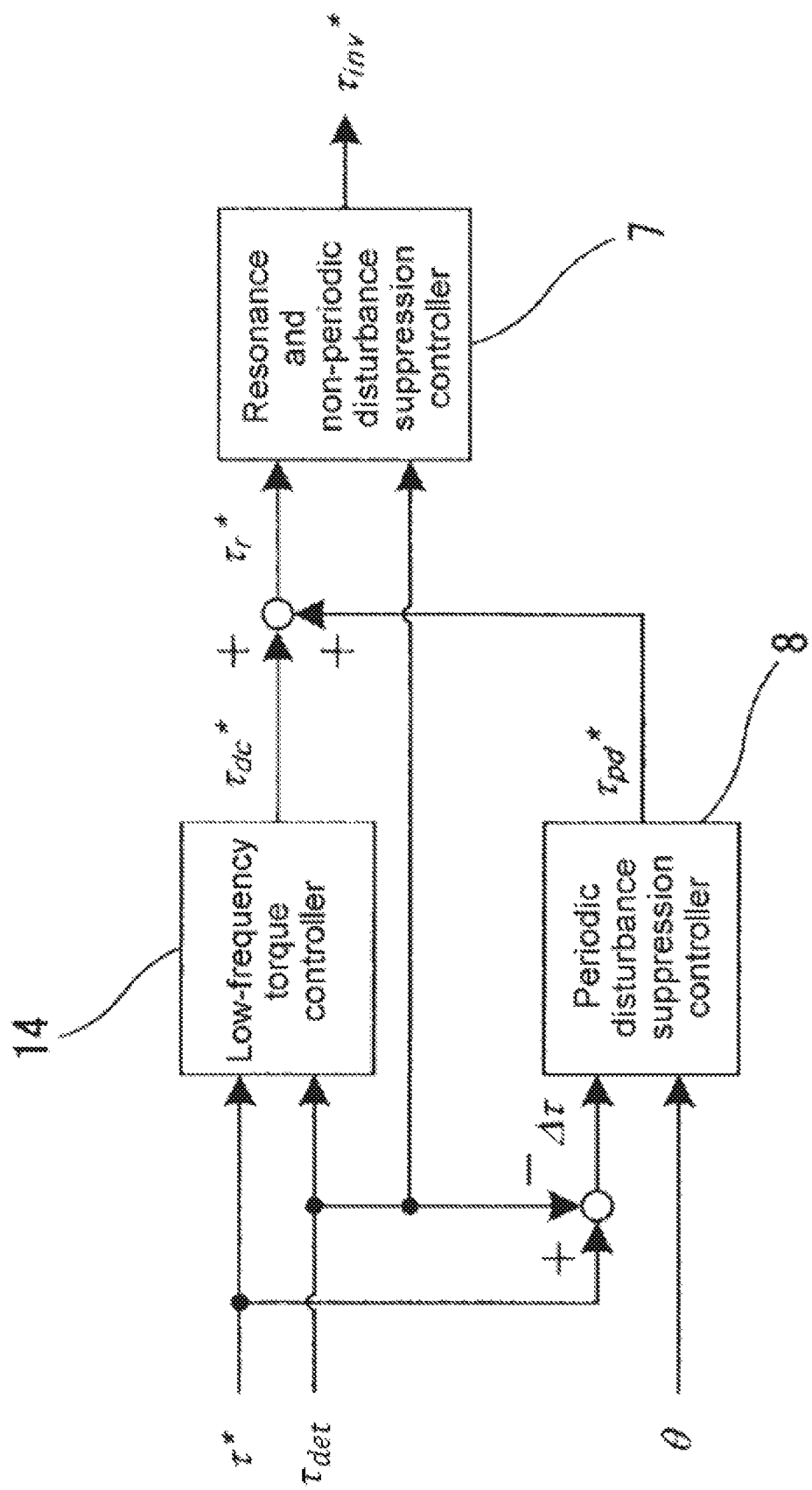
FIG. 20 is a diagram showing a feedback controller according to Embodiment 5.

Therefore, in the present Embodiment 5, as shown in FIG. 20, a method will be described in which a resonance and non-periodic disturbance suppression controller 7 focuses on resonance suppression and non-periodic disturbance suppression in the high-frequency region, a low-frequency torque controller 14 including steady-state torque control is realized with a general PI controller, and a periodic disturbance suppression controller 8 including these in a minor loop is added.

Figure 21:
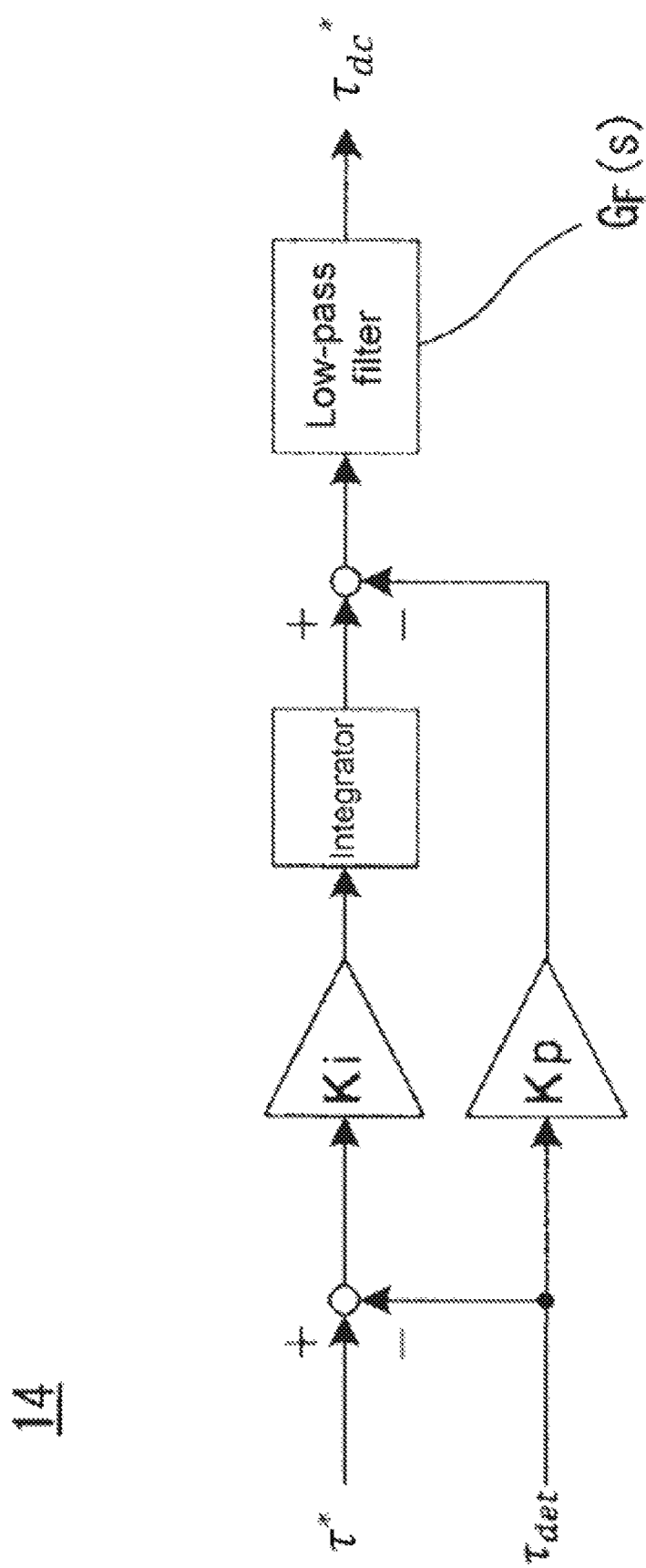
FIG. 21 is a diagram showing a configuration example of a reduced torque controller.

FIG. 21 is a basic configuration diagram for control in the example of torque control. While the periodic disturbance suppression controller 8 in the present Embodiment 5 will be explained on the basis of the generalized periodic disturbance observer for torque deviation in Embodiment 3, it is of course possible to use Embodiment 1 or other configurations.

First, the functions of the low-frequency torque controller 14 will be explained.

In a two-inertia resonance system, the steady-state torque (DC torque) properties in a mechanical system are determined by the ratio between the moments of inertia of the motor and the load. When the moment of inertia of the motor is denoted J1 and the moment of inertia of the load is denoted J2, the steady-state torque $T_{det(dc)}$ is expressed by Expression (14). The (dc) refers to a DC component.

[Expression 14]

$$\tau_{det(dc)} = \frac{J2}{J1+J2} t_{inv(dc)} \qquad (14)$$

Thus, if there is a simple way to know the inertia ratio, then it is possible to correct the torque error to some degree beforehand. However, in actual practice, there is also torque error from the inverter, error in the moment of inertia design values, viscous friction loss and the like, so it is necessary to control the steady-state torque by means of torque feedback control.

However, since there is a system resonance point from the two-inertia system in the high-frequency range, as shown in FIG. 6, when implementing torque feedback control across all frequency bands in a configuration for general PID control or the like, the control tends to become unstable, and it is difficult to implement resonance control in the frequency region.

Therefore, in the present Embodiment 5, a PI controller that contributes only to eliminate torque error in the low-frequency region including steady-state torque is formed. As one example, a configuration example for a low-frequency torque controller 14 is shown in FIG. 21.

In FIG. 21, as one example, a configuration that is based on a proportion-forward I-P controller and that passes the output therefrom through a low-pass filter $G_F(s)$ and outputs a DC torque component command value $\tau_{dc}^*$ is used. The low-pass filter $G_F(s)$ is a filter for removing the influence of system resonance properties in the high-frequency region, and is configured so that the PI controller functions within the passband of this filter, in other words, in the low-frequency region. As a result thereof, the design keeps the PI controller from becoming unstable in high frequency bands. While the design of the low-pass filter $G_F(s)$ is arbitrary, it is, for example, designed as a binomial coefficient standard second-order low-pass filter having a cutoff frequency of about 0.1 times the resonance frequency.

By using the low-pass filter $G_F(s)$, the system properties that are controlled by the present controller equivalently approximate second-order low-pass filter properties, so the closed-loop properties in the present controller are third-order properties. By matching the third-order closed-loop properties, for example, to a binomial coefficient standard reference model, $K_p$ and $K_i$ can be determined as in Expression (15).

In this case, ωc denotes a desired closed-loop response frequency which is arbitrary. $\omega_{ipf}$ denotes the cutoff frequency of the second-order low-pass filter, k denotes a coefficient of the second-order low-pass filter (the coefficient is designated in accordance with the filter format, e.g., 2 for a binomial coefficient standard filter, 1.4 for a Butterworth filter, etc.), and a2 and a1 are coefficients of the third-order reference model (a1=a2=3 for a binomial coefficient standard filter, a1=a2=2 for a Butterworth filter, etc.).

[Expression 15]

$$\begin{cases} K_P = \frac{J1+J2}{J2} \cdot \frac{a_1 k^2 - a_2^2}{a_2^2} \\ K_I = \frac{J1+J2}{J2} \cdot \frac{\omega_c k^2}{a_2^2} \\ \omega_{ipf} = \frac{a_2 \omega_c}{k} \end{cases} \qquad (15)$$

Due to this low-frequency torque controller 14, it is possible to eliminate torque error in the low-frequency region including steady-state torque and to provide stable control. However, the low-frequency torque controller 14 alone is not sufficient to suppress resonance in the high-frequency region, which is suppressed by using the aforementioned resonance and non-periodic disturbance suppression controller 7.

Figure 22:
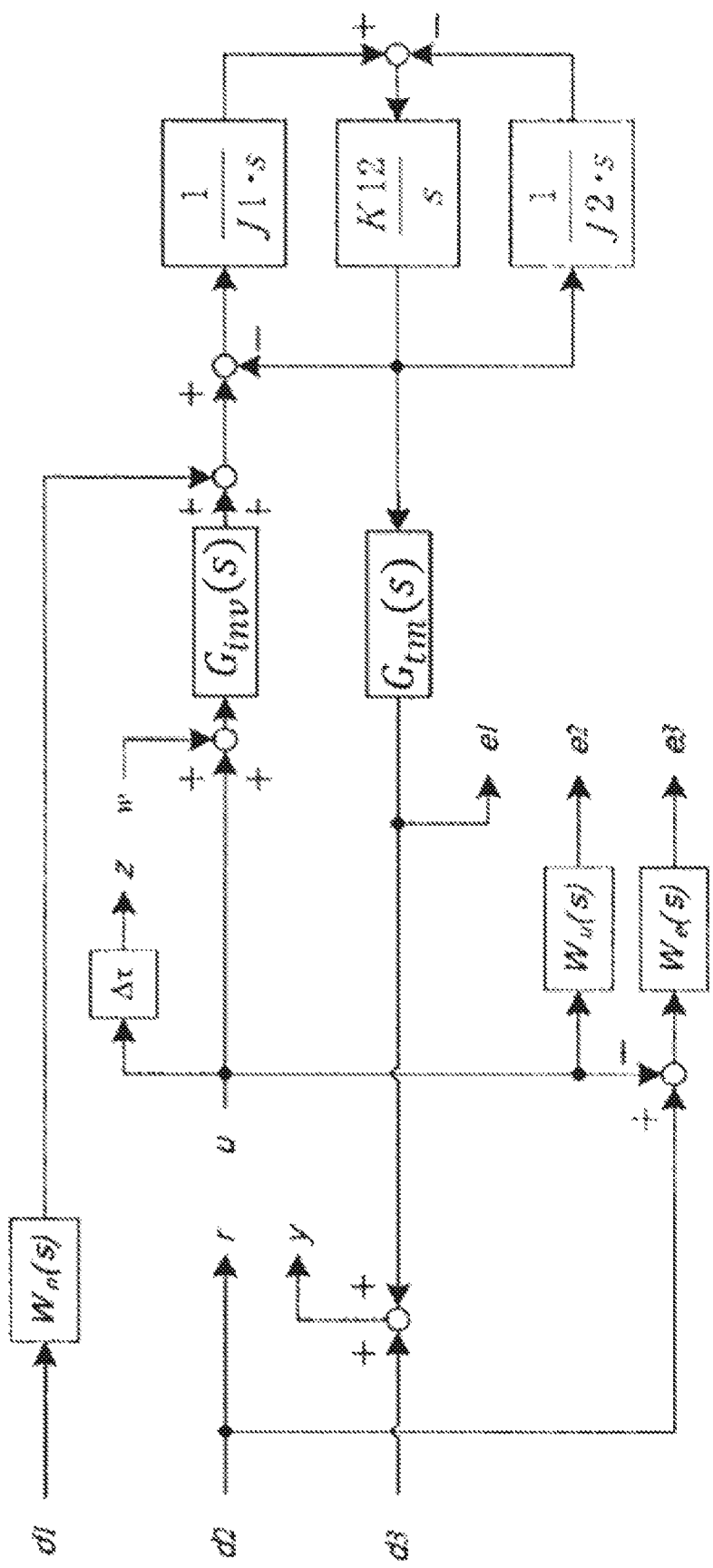
FIG. 22 is a diagram showing a generalized plant according to Embodiment 5.

Since a torque-following control in the low-frequency region is achieved by using the low-frequency torque controller 14, the resonance and non-periodic disturbance suppression controller 7 for the high frequency region is designed so as to have a low controller gain in the low frequency region. For example, when a μ-synthesis controller is used, a generalized plant is configured as in FIG. 22, and a μ-synthesis controller gain evaluation output is set by applying a weighting function $W_e(s)$ to the gain from the μ-synthesis controller input (corrected command value) r to the μ-synthesis controller output (operation amount) u. $W_e(s)$ weights the low frequency region in order to prevent control interference with the aforementioned low-frequency torque controller 14. The reference signs in FIG. 22 are defined as follows:

J1, moment of inertia of motor; J2, moment of inertia of load; K12, shaft torsional rigidity; s; Laplace operator; Δτ, steady-state torque error; $G_{tm}(s)$, detection response transfer function of torque meter or the like; $G_{inv}(s)$, inverter response transfer function; d1, disturbance (including periodic disturbances); d2 and r, μ-synthesis controller input; d3, torque detection noise; z, steady-state torque error evaluation output; w, disturbance input due to steady-state torque error; u, μ-synthesis controller output (operation amount); y, observation output (detection value); e1, torque command evaluation output; e2, inverter torque command evaluation output; e3, μ-synthesis controller gain evaluation output; $W_n(s)$, weighting function for disturbance d1; $W_u(s)$, weighting function for inverter torque command U; $W_e(s)$, weighting function for μ-synthesis controller gain.

As in Embodiment 1, a μ-synthesis controller having transfer properties Cref(s) and transfer properties Ctm(s) is designed, and is installed, with the configuration shown in FIG. 11, in the portion with the resonance and non-periodic disturbance suppression controller 7 in FIG. 20. Furthermore, the DC torque component command value $\tau_{dc}^*$ outputted by the low-frequency torque controller 14 is added to the periodic disturbance suppression controller output $\tau_{pd}^*$ outputted by the periodic disturbance suppression controller 8, thereby generating a corrected torque command value $\tau_r^*$, which is inputted to the resonance and non-periodic disturbance suppression controller 7.

Figure 23:
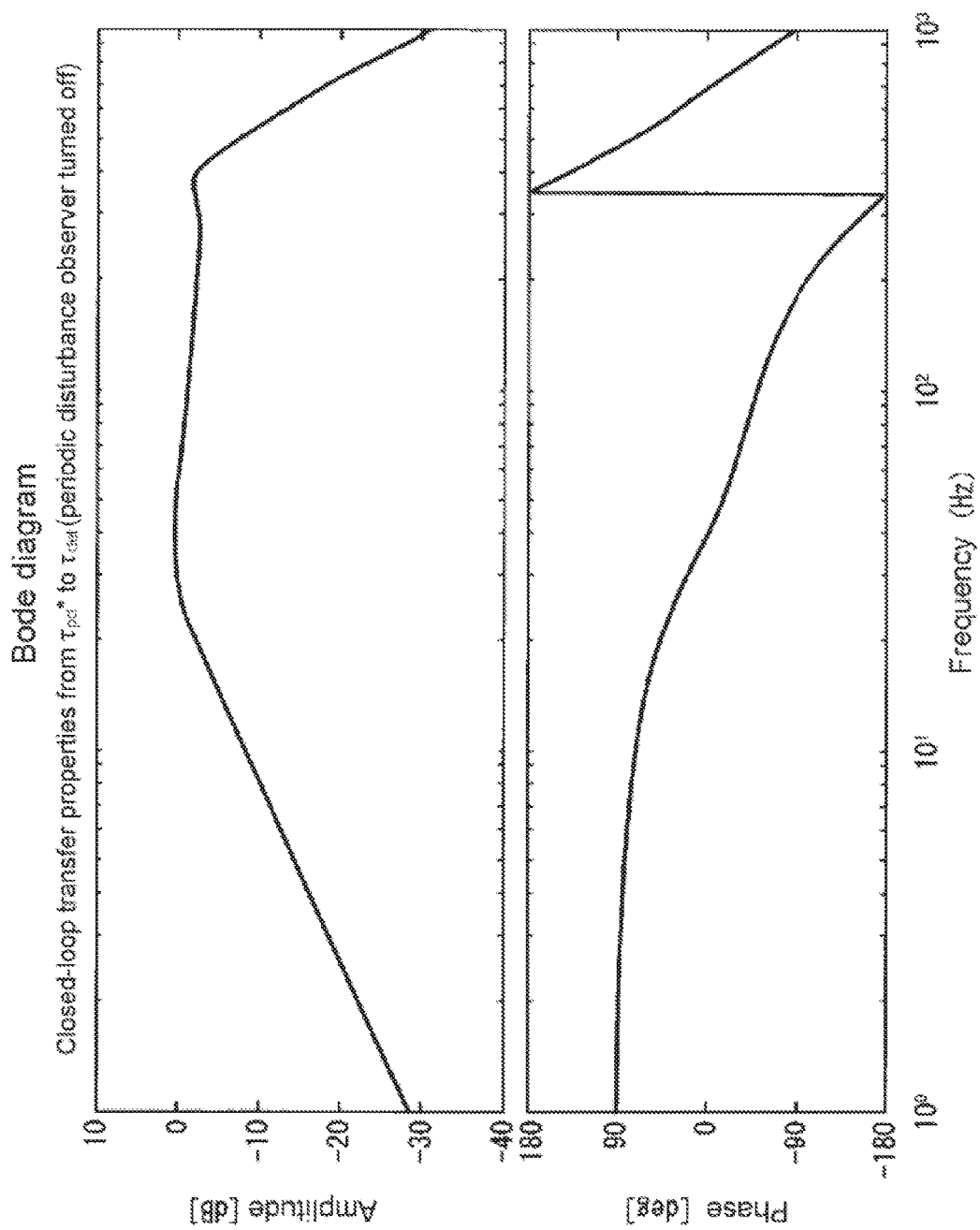
FIG. 23 is a diagram showing the closed-loop transfer properties of a minor loop seen from a periodic disturbance observer.

The closed-loop frequency transfer properties from the periodic disturbance suppression controller output $\tau_{pd}^*$ to the torque detection value $\tau_{det}$, in a state in which the resonance and non-periodic disturbance suppression controller 7 and the low-pressure torque controller 14 obtained above are installed and only the periodic disturbance suppression controller 8 is not operated, is shown in FIG. 23. The inverse model $Q_n$ of the generalized periodic disturbance observer is set by making use of these frequency transfer properties. In this way, a minor loop model is set from the perspective of the periodic disturbance suppression controller 8, the periodic disturbance observer is stably operated, and resonance, non-periodic disturbances and periodic disturbances are simultaneously suppressed.

Figure 24:
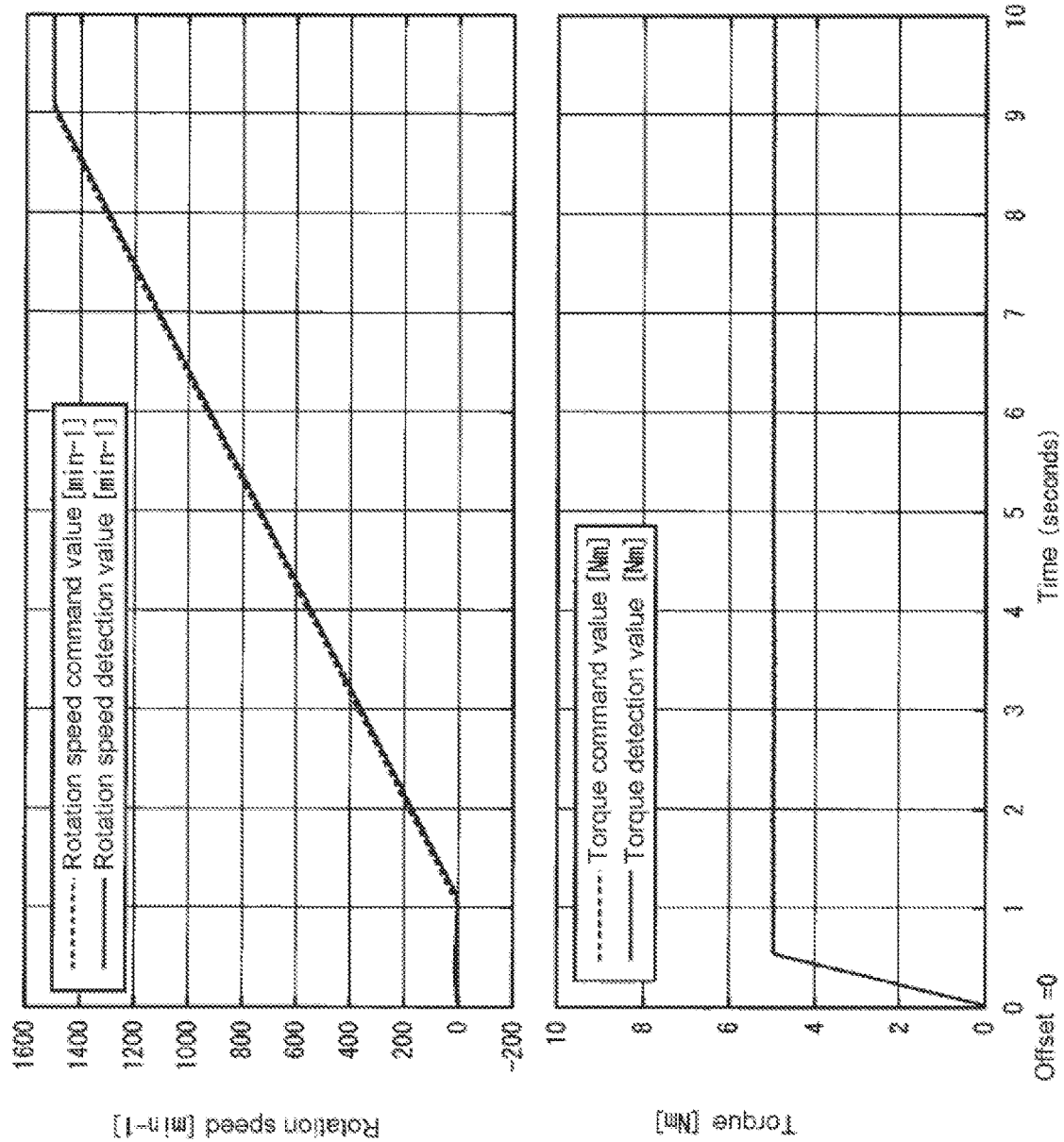
FIG. 24 is a diagram showing the torque waveform of Embodiment 5.

The results of torque control by the present Embodiment 5 are shown in FIG. 24. It can be confirmed that resonance, non-periodic disturbances and periodic disturbances are well suppressed.

According to the present Embodiment 5, functions and effects similar to those in Embodiment 1 are obtained. Additionally, the below effects can be expected.

By separating low-frequency and high-frequency controllers, it becomes easier to adjust control by means of conventional methods such as PID control in the low-frequency region.

Additionally, in a robust controller such as a μ-synthesis controller for implementing high-frequency resonance suppression control, it becomes unnecessary to consider the low-frequency torque-following performance, so it becomes easier to design the controller with a view to improving the resonance suppression performance and the quick response.

Embodiment 6

The "generalized periodic disturbance observers" in Embodiments 1-5 are periodic disturbance suppression controllers that contribute only to specific frequency components. However, in the present Embodiment 6, the numbers of the orders that are to be suppressed are separately designated and generalized periodic disturbance observers for the respective orders are arranged in parallel, and the parallel periodic disturbance compensation values are summed in a compensation signal synthesis unit, thereby allowing periodic disturbances in multiple frequency components to be suppressed simultaneously.

Although only the specific examples of the present invention were explained in detail, it will be clear to a person skilled in the art that various modifications and adjustments are possible within the scope of the technical concept of the present invention, and such modifications and adjustments naturally belong within the scope of the claims.

The invention claimed is:

1. A control system comprising a feedback controller for determining an operation amount in a control-implemented system based on a command value, a detection value of the control-implemented system and phase information for the control-implemented system, wherein
the feedback controller has:
a periodic disturbance suppression controller for outputting a periodic disturbance compensation signal based on the detection value and the phase information; and
a resonance and/or disturbance suppression controller for calculating the operation amount based on the detection value and a corrected command value obtained by adding the periodic disturbance compensation signal to the command value; and
the periodic disturbance suppression controller uses a generalized periodic disturbance observer, and wherein
the resonance and/or disturbance suppression controller has:
a μ-synthesis controller for adding an output obtained by subjecting the command value to transfer properties of the μ-synthesis controller, from the command value to the operation amount, to an output obtained by subjecting the detection value to the transfer properties of the μ-synthesis controller, from the detection value to the operation amount, and outputting the operation amount; and
the periodic disturbance suppression controller has:
a frequency component extractor for extracting a frequency component from the detection value by using an nth-order rotational phase obtained by multiplying a suppression target order number n with the phase information, and outputting an nth-order frequency component vector of periodic disturbances converted to $d_n q_n$ rotating coordinates;

a speed converter for calculating an nth-order rotational frequency by differentiating the nth-order rotational phase;

an inverse model multiplication unit for determining an nth-order frequency component vector of an operation amount estimate value by multiplying, with the nth-order frequency component vector of the periodic disturbances, an inverse model to which a single frequency vector synchronized with the nth-order rotational frequency is applied;

a first subtractor for subtracting, from the nth-order frequency component vector of the operation amount estimate value, a value obtained by passing an nth-order frequency component vector of a periodic disturbance compensation value through a low-pass filter, and outputting an nth-order frequency component vector of a periodic disturbance estimate value;

a second subtractor for subtracting, from an nth-order frequency component vector of a periodic disturbance command value, the nth-order frequency component vector of the periodic disturbance estimate value, and outputting the nth-order frequency component vector of the periodic disturbance compensation value; and a compensation signal synthesis unit for restoring the nth-order frequency component vector of the periodic disturbance compensation value from the $d_n q_n$ rotating coordinate system synchronized with the periodic disturbances to a time waveform based on the nth-order rotational phase, and outputting the periodic disturbance compensation signal.

2. The control system according to claim 1, wherein the detection value used in the frequency component extractor is a value that has been passed through a high-pass filter.

3. The control system according to claim 1, comprising a torque controller for outputting a direct current (DC) torque component command value based on the command value and the detection value; wherein
a value obtained by adding the DC torque component command value to the periodic disturbance compensation signal is used as the corrected command value; and
the torque controller comprises:
a proportional-integral (PI) controller and a low-pass filter.

4. The control system according to claim 1, having multiple periodic disturbance suppression controllers having different suppression target order numbers, wherein a value obtained by summing the outputs of each of the periodic disturbance suppression controllers is used as the periodic disturbance compensation signal.

5. A control system comprising a feedback controller for determining an operation amount in a control-implemented system based on a command value, a detection value of the control-implemented system and phase information for the control-implemented system, wherein
the feedback controller has:
a periodic disturbance suppression controller for outputting a periodic disturbance compensation signal based on the detection value and the phase information; and
a resonance and/or disturbance suppression controller for calculating the operation amount based on the detection value and a corrected command value obtained by adding the periodic disturbance compensation signal to the command value; and
the periodic disturbance suppression controller uses a generalized periodic disturbance observer, and wherein
the resonance and/or disturbance suppression controller has:

a µ-synthesis controller for adding an output obtained by subjecting the command value to transfer properties of the µ-synthesis controller, from the command value to the operation amount, to an output obtained by subjecting the detection value to the transfer properties of the µ-synthesis controller, from the detection value to the operation amount, and outputting the operation amount; and
the periodic disturbance suppression controller has:
a frequency component extractor for extracting a frequency component from a deviation obtained by subtracting the detection value from the command value using an nth-order rotational phase obtained by multiplying a suppression target order number n with the phase information, and outputting an nth-order frequency component vector of periodic disturbances converted to $d_n q_n$ rotating coordinates;
a speed converter for calculating an nth-order rotational frequency by differentiating the nth-order rotational phase;
an inverse model multiplication unit for determining an nth-order frequency component vector of an operation amount estimate value by multiplying, with the nth-order frequency component vector of the periodic disturbances, an inverse model to which a single frequency vector synchronized with the nth-order rotational frequency is applied;
an adder for adding the nth-order frequency component vector of the operation amount estimate value to the value of the nth-order frequency component vector of a periodic disturbance compensation value that has been passed through a low-pass filter, and outputting the nth-order frequency component vector of the periodic disturbance compensation value; and
a compensation signal synthesis unit for restoring the nth-order frequency component vector of the periodic disturbance compensation value from the $d_n q_n$ rotating coordinate system synchronized with the periodic disturbances to a time waveform based on the nth-order rotational phase, and outputting the periodic disturbance compensation signal.

6. The control system according to claim 5, comprising a torque controller for outputting a direct current (DC) torque component command value based on the command value and the detection value; wherein
a value obtained by adding the DC torque component command value to the periodic disturbance compensation signal is used as the corrected command value; and
the torque controller comprises:
a proportional-integral (PI) controller and a low-pass filter.

7. The control system according to claim 5, having multiple periodic disturbance suppression controllers having different suppression target order numbers, wherein a value obtained by summing the outputs of each of the periodic disturbance suppression controllers is used as the periodic disturbance compensation signal.

8. A control system comprising a feedback controller for determining an operation amount in a control-implemented system based on a command value, a detection value of the control-implemented system and phase information for the control-implemented system, wherein
the feedback controller has:
a periodic disturbance suppression controller for outputting a periodic disturbance compensation signal based on the detection value and the phase information; and a resonance and/or disturbance suppression controller for calculating the operation amount based on the detection value and a corrected command value obtained by adding the periodic disturbance compensation signal to the command value; and the periodic disturbance suppression controller uses a generalized periodic disturbance observer, and wherein the resonance and/or disturbance suppression controller has:

a μ-synthesis controller for adding an output obtained by subjecting the command value to transfer properties of the μ-synthesis controller, from the command value to the operation amount, to an output obtained by subjecting the detection value to the transfer properties of the μ-synthesis controller, from the detection value to the operation amount, and outputting the operation amount; and the periodic disturbance suppression controller has:

a frequency component converter for outputting an nth-order frequency component vector of periodic disturbances obtained by converting, to $d_n q_n$ rotating coordinates, deviation obtained by subtracting the detection value from the command value using an nth-order rotational phase obtained by multiplying a suppression target order number n with the phase information;

a speed converter for calculating an nth-order rotational frequency by differentiating the nth-order rotational phase;

an inverse model multiplication unit for determining an nth-order frequency component vector of an operation amount estimate value by multiplying, with the nth-order frequency component vector of the periodic disturbances, an inverse model to which a single frequency vector synchronized with the nth-order rotational frequency is applied;

an adder for integrating the nth-order frequency component vector of the operation amount estimate value, and outputting the nth-order frequency component vector of the periodic disturbance compensation value; and a compensation signal synthesis unit for restoring the nth-order frequency component vector of the periodic disturbance compensation value from the $d_n q_n$ rotating coordinate system synchronized with the periodic disturbances to a time waveform based on the nth-order rotational phase, and outputting the periodic disturbance compensation signal.

9. The control system according to claim 8, comprising torque controller for outputting a direct current (DC) torque component command value based on the command value and the detection value; wherein a value obtained by adding the DC torque component command value to the periodic disturbance compensation signal is used as the corrected command value; and the torque controller comprises:

a proportional-integral (PI) controller and a low-pass filter.

10. The control system according to claim 8, having multiple periodic disturbance suppression controllers having different suppression target order numbers, wherein a value obtained by summing the outputs of each of the periodic disturbance suppression controllers is used as the periodic disturbance compensation signal.

* * * * *